United States Patent [19]

Radochonski

[11] Patent Number: 4,989,138
[45] Date of Patent: Jan. 29, 1991

[54] SINGLE BUS GRAPHICS DATA PROCESSING PIPELINE WITH DECENTRALIZED BUS ARBITRATION

[75] Inventor: Pierre A. Radochonski, Lake Oswego, Oreg.

[73] Assignee: Tektronix, Inc., Beaverton, Oreg.

[21] Appl. No.: 522,508

[22] Filed: May 14, 1990

Related U.S. Application Data

[63] Continuation of Ser. No. 239,875, Sep. 2, 1988, abandoned.

[51] Int. Cl.⁵ .......................... G06F 9/38; G06F 13/16
[52] U.S. Cl. ................................. 364/200; 364/231.8; 364/242.92; 364/229
[58] Field of Search ... 364/200 MS File, 900 MS File

[56] References Cited

U.S. PATENT DOCUMENTS 4,542,455  9/1985  Demeure ........................... 364/200

Primary Examiner—Lawrence E. Anderson
Attorney, Agent, or Firm—John D. Winkelman; John P. Dellett

[57] ABSTRACT

Stages of a graphics data processing pipeline are interconnected by a common bus for conveying data and arbitration signals to and from each stage. Each data transmitting stage arbitrates for and acquires control of the bus when it has output data to transmit to an addressable storage location within a next stage. Each pipeline stage other than a first stage generates a BUSY bit indicating whether it is processing data or awaiting new input data from its preceding stage. When one pipeline stage has output data to transmit to a next pipeline stage, the transmitting stage periodically polls the receiving stage by acquiring control of the bus and placing on the bus a particular address associated with the next stage. Whenever the next stage detects the presence of the particular address on the bus, it places its BUSY bit on the data lines of the bus. When the sending stage determines from the state of the BUSY bit that the next stage is ready to receive input data, the sending stage acquires control of the bus and sends the input data thereon to the next stage.

8 Claims, 19 Drawing Sheets

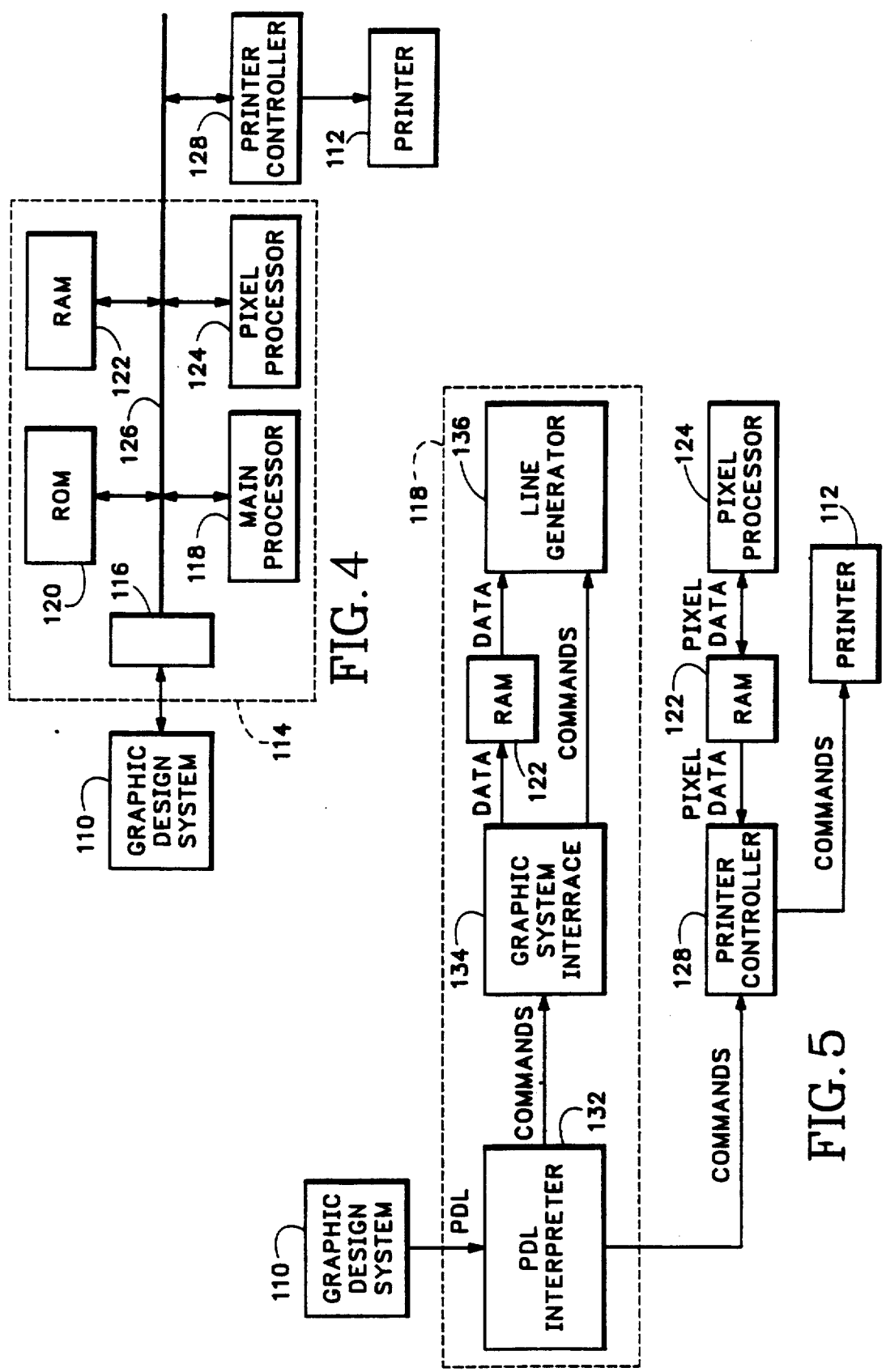

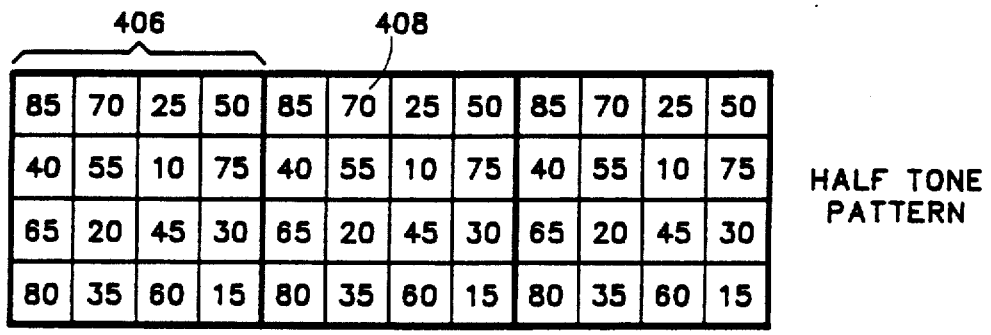
FIG. 22A   HALF TONE PATTERN
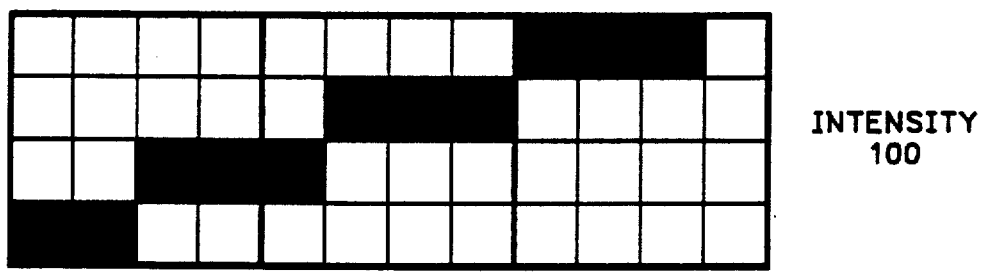
FIG. 22B   INTENSITY 100
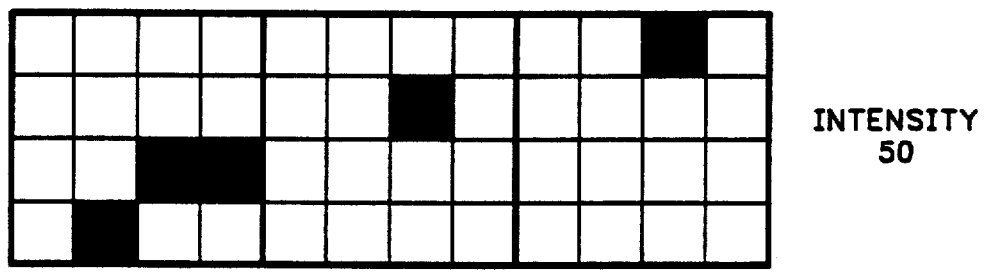
FIG. 22C   INTENSITY 50
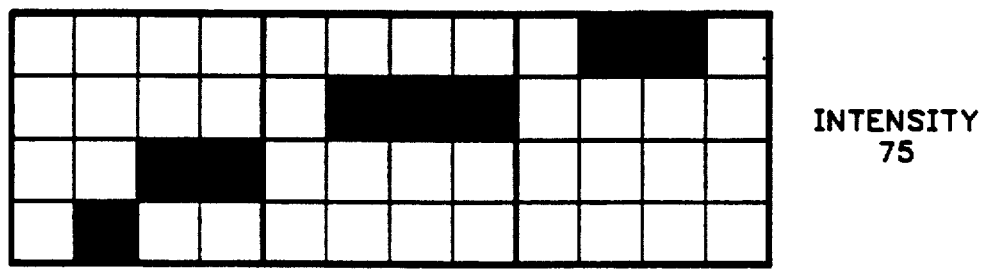
FIG. 22D   INTENSITY 75

SINGLE BUS GRAPHICS DATA PROCESSING PIPELINE WITH DECENTRALIZED BUS ARBITRATION

This is a continuation of application Ser. No. 07/239,875, filed Sept. 2, 1988 and now abandoned.

CROSS-REFERENCES TO RELATED APPLICATIONS

U.S. patent application Ser. No. 07/239,736, entitled "Half Toning Pixel Processor", filed Sept. 2, 1988 describes and claims a pixel processor similar to that described herein. U.S. patent application Ser. No. 07/240,855, entitled "Dynamically Configurable, Demand Driven Data Processing Pipeline", filed Sept. 2, 1988 describes and claims a system similar to the first stage of the graphics data processing pipeline described herein.

BACKGROUND OF THE INVENTION

The present invention relates to a data processing pipeline employing multiple stages to carry out a sequence of data processing operations and in particular to a graphics data processing pipeline employing a common bus for conveying data between stages.

A graphics data processing pipeline employs a set of stages to carry out a sequence of data processing operations on input picture description data to produce a bit map of the picture. A separate pipeline stage implements each processing operation and the stages may operate concurrently when processing successive elements of the picture description data. However, such a pipeline employs separate busses to convey data between successive stages, and each stage must include port circuitry for interfacing the stage to both its input and output busses. The multiple busses and ports add expense and complexity to the pipeline system.

SUMMARY OF THE INVENTION

In accordance with one aspect of the invention, various stages of a graphics data processing pipeline are interconnected by a common bus for conveying data, addresses and control signals to and from each stage. The bus also includes lines conveying arbitration signals between the stages, and each stage arbitrates for and acquires control of the bus when it has output data to transmit to another stage. Since each stage utilizes the bus during only a portion of the time it carries out its processing operation, time sharing the bus need not substantially degrade system throughout.

In accordance with another aspect of the invention, each stage receiving data from a preceding stage includes at least one addressable data storage device for receiving and storing input data conveyed on the bus from the preceding stage.

In accordance with a further aspect of the invention, each pipeline stage receiving data from a preceding stage generates a BUSY bit indicating whether it is currently processing input data or is awaiting new input data from its preceding stage. When one pipeline stage has output data to send to a next pipeline stage, the data sending stage periodically polls the next stage by acquiring control of the bus and placing on the bus a particular address associated with the next stage. When the next stage detects the presence of the particular address on the bus, it places its BUSY bit on the data lines of the bus. When the sending stage determines from the state of the BUSY bit that the next stage is ready to receive input data, the sending stage acquires control of the bus and sends the input data thereon to an addressable storage location within the next stage.

In accordance with still another aspect of the invention, the pipeline includes a random access memory (RAM) connected to the bus and various stages employ the RAM for temporary data storage in the course of carrying out its data processing operation.

In accordance with yet another aspect of the invention, in a particular embodiment thereof a graphics pipeline system comprises two stages, a computer processor and a pixel processor. The computer processor executes instructions causing it to convert a picture description describing a picture as a set of complex graphic objects into data describing the same picture as a set of lines, each line having an origin, length, direction and intensity. The computer processor transmits data for each line to the pixel processor, one line at a time, and the pixel processor converts the line descriptions from the computer processor into the bit map.

It is accordingly an object of the invention to provide an improved data processing pipeline having stages operating concurrently but communicating through a common bus.

It is another object of the invention to provide an improved graphics picture processing pipeline for rapidly converting an object-oriented description of a picture to a bit map of the picture.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWING

FIG. 4 is a block diagram illustrating a graphics design and printing system utilizing a single bus pipeline in accordance with the present invention;

FIG. 5 illustrates data flow through the graphics design and printing system of FIG. 4;

FIGS. 22A-22D illustrate a half toning scheme; and

DESCRIPTION OF THE PREFERRED EMBODIMENT(S)

Figure 1:
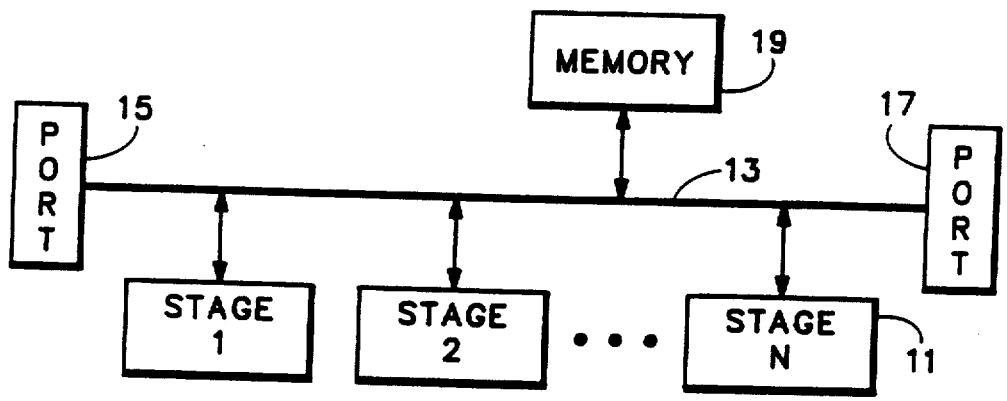
FIG. 1 is a block diagram illustrating a data process pipeline in accordance with the present invention.

A data processing pipeline implements a set of data processing operations converting pipeline input data to pipeline output data. Referring to FIG. 1, the pipeline includes a set of N processing stages 11, each stage implementing one or more data processing operations. Stage 1 receives the pipeline input data, and the output data produced by each stage other than stage N provides input to a next succeeding pipeline stage. The last pipeline stage (stage N) provides the pipeline output data. A common bus 13 connects the stages 11 and conveys input and output data to and from each stage. Bus 13 also interconnects a pair of ports 15 and 17 and an addressable memory 19 to the stages. An external driving circuit (not shown) provides pipeline input data via port 15 and bus 13 alternatively by writing the data directly into addressable storage locations within pipeline stage 1 or by writing data into memory 19 for subsequent access by stage 1. Stage N may alternatively transmit the pipeline output data to an external circuit (not shown) via port 17 or may store the data in memory 19 for subsequent access by the external circuit via port 17. Various other stages 11 may also read or write access data files in memory 19 in the course of carrying out their data processing operations.

The bus 13 includes lines conveying arbitration signals between the stages, and each stage utilizes the arbitration signals to arbitrate for and acquire control of the bus when it has output data to transmit to a next stage or when it wants to read or write access memory 19. The stages 11 operate concurrently and time share the common bus. However, since each stage 11 uses the bus during only a portion of the time it carries out its processing operation, time sharing the bus does not substantially degrade system throughput.

Figure 2:
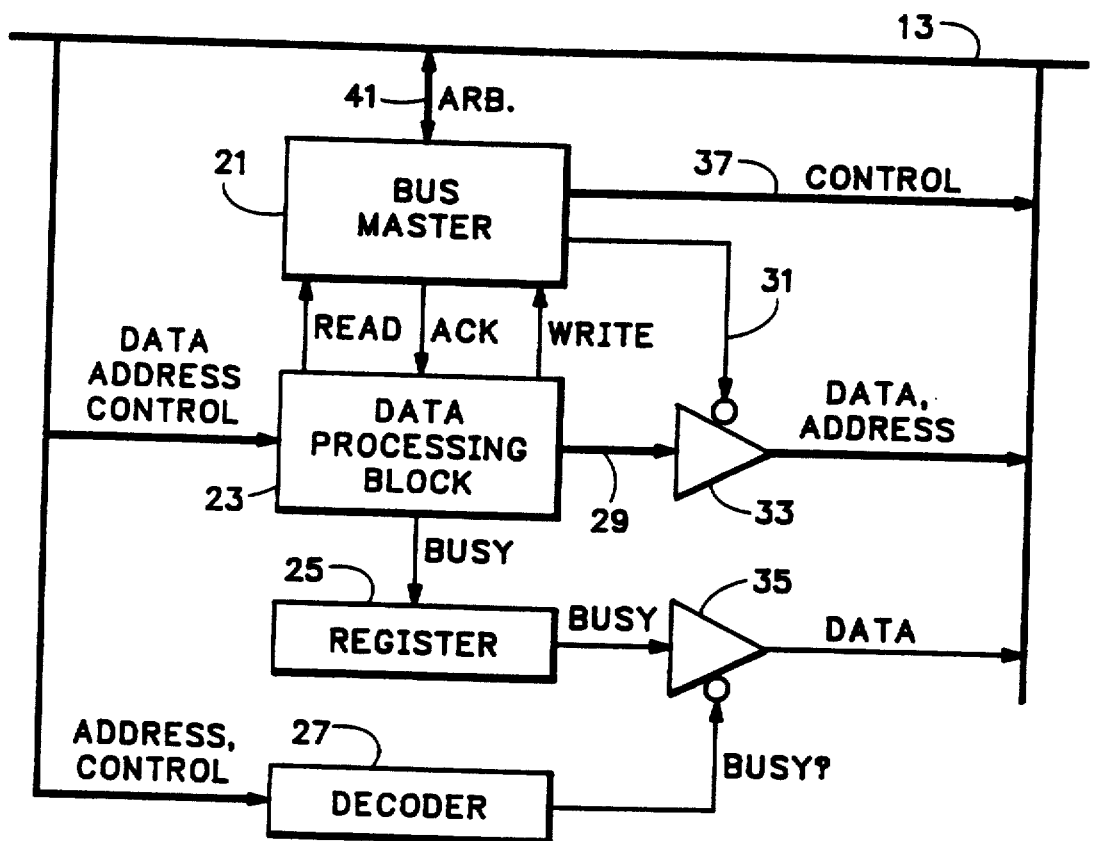
FIG. 2 is a functional block diagram illustrating a typical stage of the pipeline of FIG. 1.

FIG. 2 is a functional block diagram of a typical stage 11 of FIG. 1. The stage includes a bus master 21, a data processing block 23, a register 25 and a decoder 27. The data processing block 23 receives input data conveyed on bus 13 and carries out the data processing operation of the stage on that input data to produce output data and addresses on a bus 29. A set of tri-state buffers 33 selectively connect bus 29 to bus 13 in response to control signals 31 from bus master 21. The data processing block 23 also generates and stores in register 25 a single "BUSY" bit of state indicating whether the data processing block is busy processing input data or is awaiting new input data from a preceding pipeline stage. Decoder 27 monitors addresses on bus 13, and when it detects a particular address on the bus, it enables a tristate buffer 35 to place the BUSY bit stored in register 25 on one of the data lines of bus 13.

A data processing block 23 may directly read access a storage location in memory 19 of FIG. 1 by placing a desired memory address on output bus 29 and then transmitting a READ request to bus master 21. In response to the READ request, bus master 21 employs arbitration signals (ARB) 41 conveyed on the bus to obtain control of the bus, output enables tristate buffers 33 to transfer the memory address from bus 29 to bus 13 and asserts appropriate control signals 37 of bus 13 to implement a memory read operation. In response to the address on bus 13 and the control signals asserted by bus master 21, memory 19 of FIG. 1 places stored data on bus 13. Thereafter, the bus master 21 returns an acknowledge (ACK) signal to the data processing block 23, and the data processing block stores the data on bus 13. The bus master 21 then turns off buffers 33 and relinquishes control of bus 13.

Figure 3:
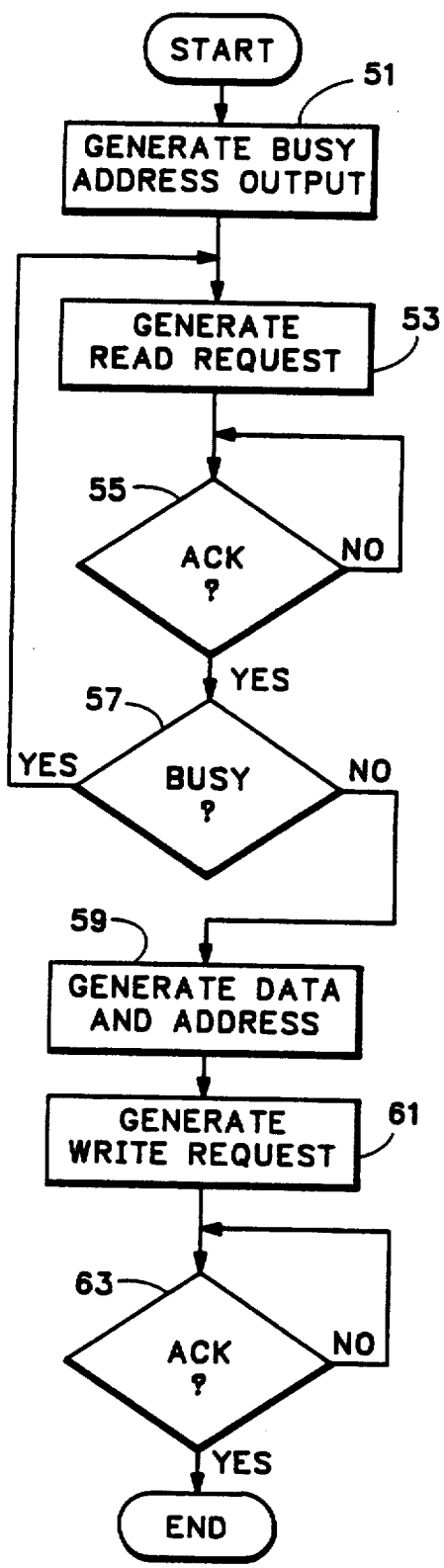
FIG. 3 is a flow chart illustrating operation of the data processing block of FIG. 2.

The data processing block 23 of stages receiving data from preceding stages of the pipeline include addressable registers or other storage devices mapped onto the address space of bus 13, and a preceding (transmitting) stage can write data directly into a register of its succeeding (receiving) stage. FIG. 3 is a flow chart illustrating operation of a data processing block 23 of a transmitting stage when writing data into an addressable register of a receiving stage. With reference to FIGS. 2 and 3, the transmitting stage initially places the address of register 25 of the receiving stage on bus 29 (step 51) and transmits a READ request signal to bus master 21 (step 53). The bus master arbitrates for control of bus 13, and on obtaining control of the bus, asserts signals 31 turning on buffers 33 to transfer the address on bus 29 to bus 13 and operates control signals 37 so as to initiate a read operation. In response to the address on bus 13, the decoder 27 of the receiving stage asserts a BUSY? output signal to enable buffer 35, thereby placing the BUSY bit on a data line of bus 13. The bus master 21 of the transmitting stage then sends an ACK signal to data processing block 21 indicating the BUSY bit is on bus 13, and thereafter relinquishes control of bus 13. Data processing block 23 awaits receipt of the ACK signal (step 55) and then checks the state of the BUSY bit to determine whether the receiving stage is busy. If so, the data processing block 23 repeats steps 53, 55 and 57 until at step 57 the BUSY bit indicates the receiving stage is not busy.

At that point, the data processing block 23 places the data to be written into a register of the receiving stage on bus 29 along with the appropriate address of the register (step 59) and transmits a WRITE request signal to bus master 21 (step 61). The bus master 21 then arbitrates for and obtains control of bus 13, output enables buffers 33 to transfer the data and address on bus 29 to bus 13, and asserts control signals 37 to write the data into the addressed register. Thereafter, the bus master 21 sends an ACK signal to data processing block 23 indicating completion of the data write operation, turns off buffers 33, and relinquishes control of bus 13. After generating the WRITE request signal at step 61, the data processing block 23 of the transmitting stage awaits receipt of the ACK signal from the bus master 21 (step 63) before terminating the write operation.

FIG. 4 illustrates a preferred embodiment of the present invention, a graphic picture processing pipeline 114 employing two processing stages to convert a high level description of a picture generated by a computer-aided graphic design system 110 to a bit map of the picture. The description is written in a picture description language (PDL) describing the picture as a set of graphic objects (characters, lines, rectangles, circles, etc.), each object having various attributes (color, fill pattern, thickness etc.). When the picture is to be printed on a page by a printer 112, the graphics design system 110 transmits the PDL picture description to picture processing pipeline 114 via port 116. The picture processing pipeline 114 includes a data processor 118 (suitably a Motorola model 68020), a read only memory (ROM) 120, a random access memory (RAM) 122, and a pixel processor 124, all connected to a bus 126.

Main processor 118 implements the first stage of the picture processing pipeline 114. Operating under instructions read out of ROM 120 and temporarily stored in an internal cache, and employing RAM 122 or the internal cache for temporary data storage, main processor 118 converts the input high level picture description into output data describing the same picture as a set of pixel lines. The line data indicates coordinates of one end of the line on the page (its origin), a direction of the line from the origin, the length of the line (i.e., the number of pixels spanned by the line), and its color intensity.

Pixel processor 124 implements the second stage of the picture processing pipeline 114. Main processor 118 transmits the data describing each line to pixel processor 124 via bus 126 and pixel processor 124 processes the data to determine which pixels of the graphic page to ink ("turn on") to form the line. The pixel processor updates a bit map of the page stored in a portion of RAM 122 accordingly. The bit map is a set of addressable, 32-bit pixel data words. Each bit of each pixel data word corresponds to a particular pixel on the page and indicates whether to turn on or off the corresponding pixel when the page is printed. When processing a line description, the pixel processor 124 addresses and reads a succession of pixel data words out of the bit map, each pixel data word including at least one bit corresponding to a pixel along the path of the line. For each bit of the pixel data word, the pixel processor determines whether to turn on or off the corresponding pixel and sets the state of the bit accordingly. After altering relevant bits of a pixel data word, the pixel processor writes the altered pixel data word back into the bit map in RAM 122. A printer controller 128 is also connected to bus 126, and when pixel processor 124 completes processing all line data, main processor 118 commands printer controller 128 to sequentially read out the pixel data stored in RAM 122 and to transmit printer control data to printer 112 such that printer 112 prints out the graphic page defined by the bit map.

The main processor 118 converts the PDL picture description to line data using a sequence of software implemented data processing steps as illustrated in FIG. 5. A PDL interpreter 132 forwards PDL commands describing various objects of the graphic design to a graphic system interface routine 134. The graphic system interface routine 134 responds to some of these commands by storing data conveyed by the commands in RAM 122 and by forwarding other commands to a "line generator" 136.

In response to input commands from the graphic system interface 134, the line generator 136 carries out various sequences of operations on the stored data to generate line data input for pixel processor 124. Pixel processor 124 responds to the line data by updating the bit map in RAM 122. When the line generator 136 has processed the graphic data, the PDL interpreter 132 responds to a PDL command to initiate printing by transmitting appropriate commands to printer controller 128. Controller 128 then reads the bit map data out of RAM 122 and controls printer 122 accordingly.

Figure 6:
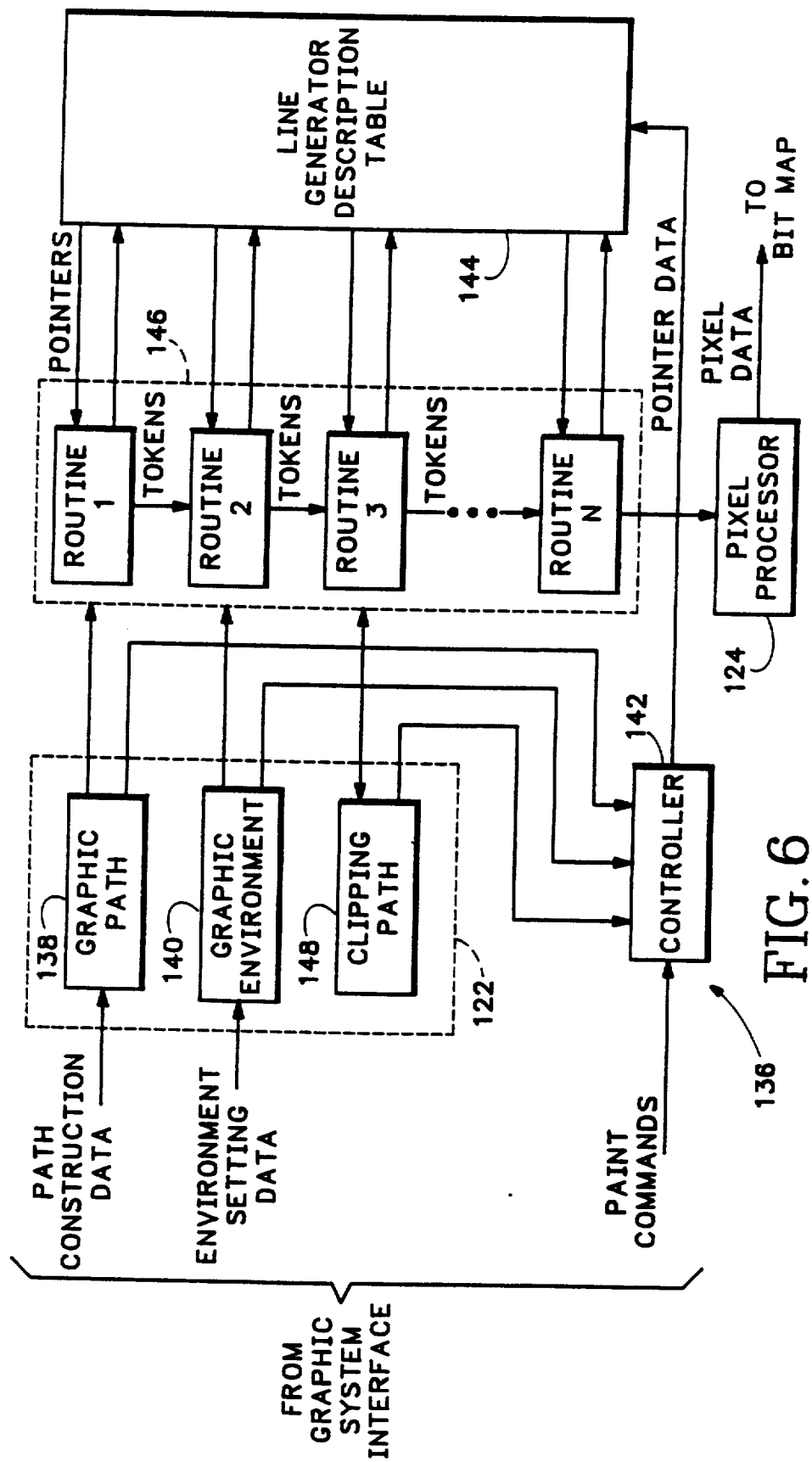
FIG. 6 is a block diagram of the line generator of FIG. 5.

FIG. 6 is a functional block diagram illustrating organization and data flow within the line generator 136 of FIG. 5. Referring to FIG. 6, the graphic system interface responds to three types of commands. A "path construction" command tells the graphic system interface to adjust contents of a "graphic path" data structure 138 stored in RAM 122 of FIG. 4. This data structure defines the outline and position within a graphic design of one of the objects forming the graphic design. A "graphic environment" command tells the interface system 134 to adjust contents of a "graphic environment" data structure 140 stored in RAM 122. The graphic environment data structure defines various attributes of the object referenced by the graphic path data file. Such attributes may include color, intensity, line thickness, fill pattern, etc. "Paint" commands invoke various operations of the line generator 136, and the graphic system interface forwards these commands to the line generator 136.

In the preferred embodiment, there are three types of paint commands. A "fill" paint command treats the graphic path data 138 as describing an outline of a graphic object to be drawn having a fill color, pattern and intensity attributes described by the graphic environment data 140. A "stroke" paint command treats the graphic path data 138 as describing one or more lines to be drawn, each line having a color, thickness and intensity described by the graphic environment data 140. A "clip" paint command treats the graphic path data 138 as describing an outline bounding a "clipping" area of the graphic page to which objects drawn by subsequent fill and stroke paint commands are limited.

In response to a clip paint command, various line generator routines 146 operate in succession to transfer the graphic path data 140 into a "clipping path" data structure 148, also stored in RAM 122. Thereafter, when generating line representation of a graphic object in response to a fill or stroke command, the line generator 136 not only consults the graphic path and environment data to determine the shape, position and attributes of an object to be drawn, the line generator also consults the clipping path data 148, and when necessary "clips" portions of the object lying outside the clipping path by excluding those portions from the line representation of the picture.

The line generator 136 includes a set of routines 146 for carrying out various sequences of data processing operations in response to various paint commands. The graphic system interface 134 forwards paint commands to controller 142, a software routine that selects the order in which various routines 146 are executed. The line generator is "demand driven" in that routines call one another to obtain input data. (Hereinafter a data structure passed from one routine to another is called a "token"). The controller 142 initiates data processing by calling one routine 146 which in turn calls one or more other routines 146 to obtain its input tokens. Each called routine calls other routines to obtain their input tokens until a "source" routine is called. A source routine obtains its input data from a data structure in RAM 122, processes it and returns a token to its calling routine. Thereafter, tokens flow from routine to routine until the first called routine 146 receives and processes its input tokens, thereby producing line generator output data.

Each routine requiring an input token from another routine determines which routine to call by consulting an entry in a line generator description table 144. When the controller 142 receives a paint command, it determines which line generator routines 146 are needed to execute the command and adjusts pointer data in table 144. Once the controller 142 has stored appropriate pointers in description table 144, the controller calls the last routine to initiate line generator operation.

Figure 7:
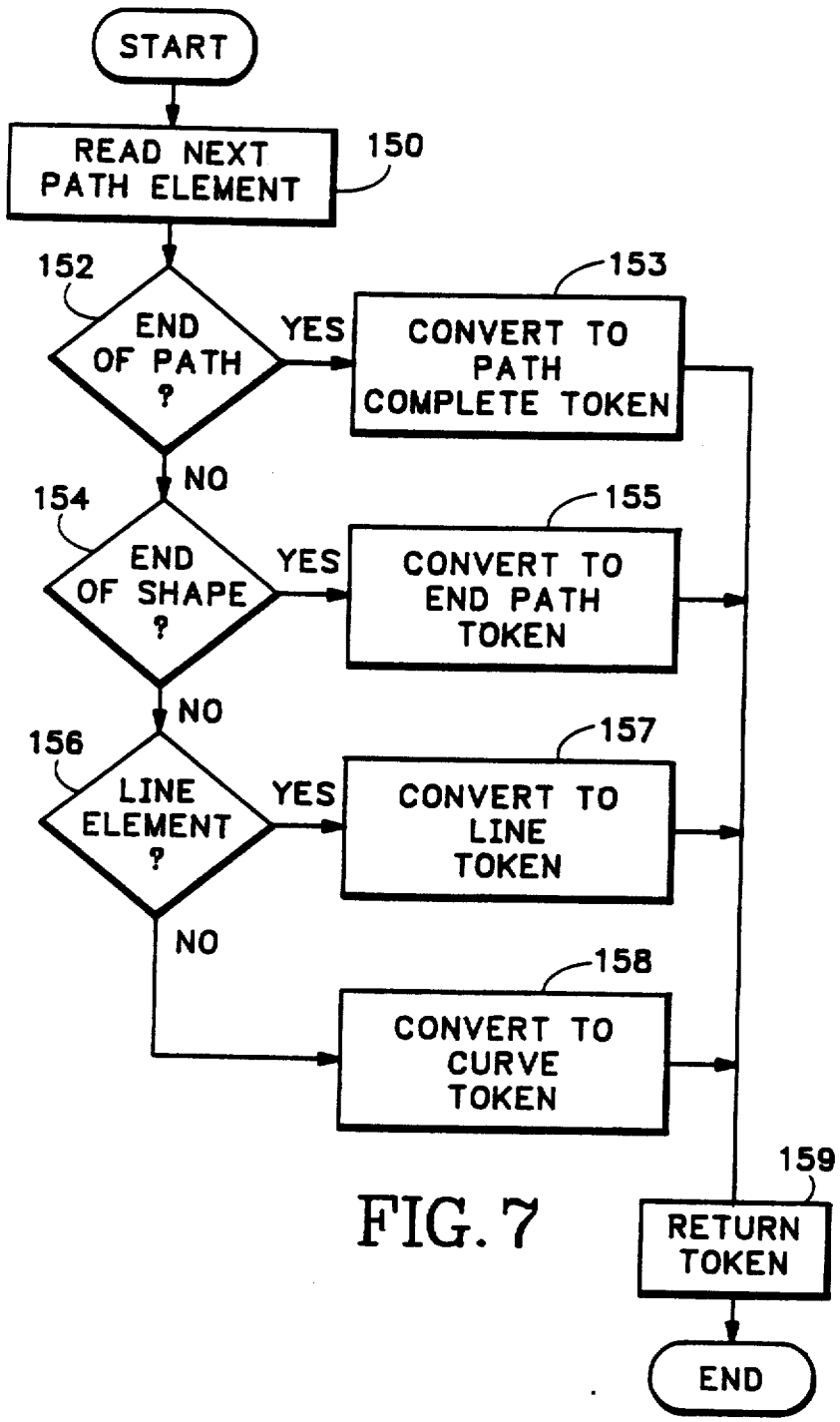
FIG. 7 is a flow chart illustrating operation of a PATH-READER routine.

FIG. 7 is a flow chart illustrating operation of a "PATH-READER" routine invoked to read data elements out of the graphic path data structure 138 of FIG. 6 and to convert them to output tokens. The graphic path is a collection of graphic shapes and each data element of the graphic path data structure describes a straight or curved line forming a portion of the outline of a graphic shape. An "end of shape" element follows the set of line elements describing the outline of each shape of the graphic path. The last element of the graphic path data is an "end of path" element. Each time another routine calls the PATH-READER routine, the PATH-READER routine reads a next element of the graphic path (step 150). If the element is an "end of path" element indicating that the PATH-READER routine has already read all other data elements of the graphic path (step 152), the PATH-READER routine converts the end of path element to a "Path Complete" token (step 153) and returns the token to its calling routine (step 159). If the path element read is an end of shape element (step 154), the PATH-READER routine generates an "End Path" token (step 155) and returns it to its calling routine (step 159). If the graphic path element read at step 150 defines a straight line (step 156), the PATH-READER routine converts the element to a Line token describing the straight line and returns the Line token to the calling routine (step 159). Otherwise, the element read defines a curved line, and the PATH-READER routine converts the curved line element to a Curve token describing the curved line (step 158) and returns the Curve token (step 159). A "CLIPPATH-READER routine" routine is similar to the PATH-READER routine of FIG. 4 but reads path data elements out of the clipping path data structure 148 of FIG. 6, rather than out of the graphic path data structure 138.

Figure 8:
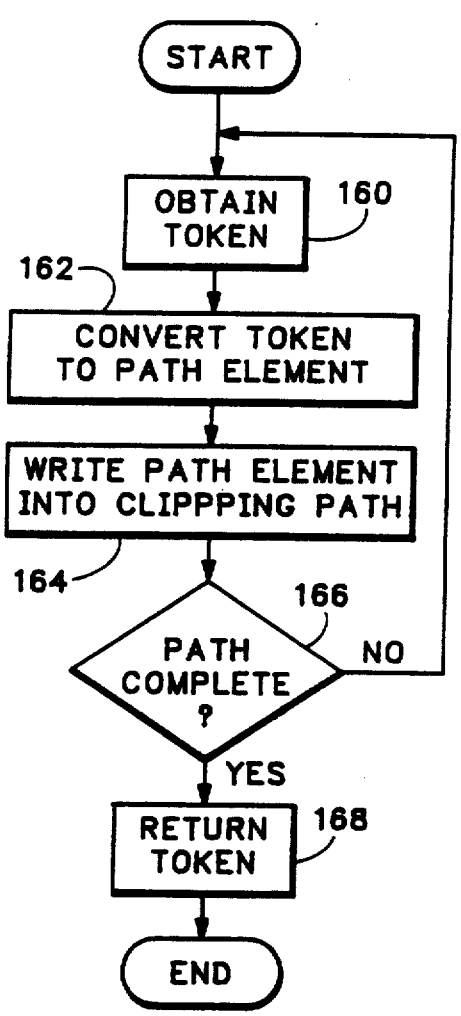
FIG. 8 is a flow chart illustrating operation of a CLIPPATH-WRITER routine.

FIG. 8 illustrates a CLIPPATH-WRITER routine called to write data into the clipping path data structure 148 of FIG. 6. When called, the CLIPPATH-WRITER routine obtains an input token (step 160) by consulting a particular entry in table 144 of FIG. 6 to determine the routine to supply the token, calling that routine, and awaiting return of the token from the called routine. The CLIPPATH-WRITER routine then converts the input token into a clipping path element (step 162) and writes the element into the clipping path data structure (step 164). If the last written path element is not a path complete element, the CLIPPATH-WRITER routine returns to step 160 to obtain another input token. The CLIPPATH-WRITER routine continues to loop through steps 160-166 until it has written a path complete element into the clipping path. At this point the CLIPPATH-WRITER routine returns a Path Complete token to its invoking routine (step 168) and terminates.

Figure 9:
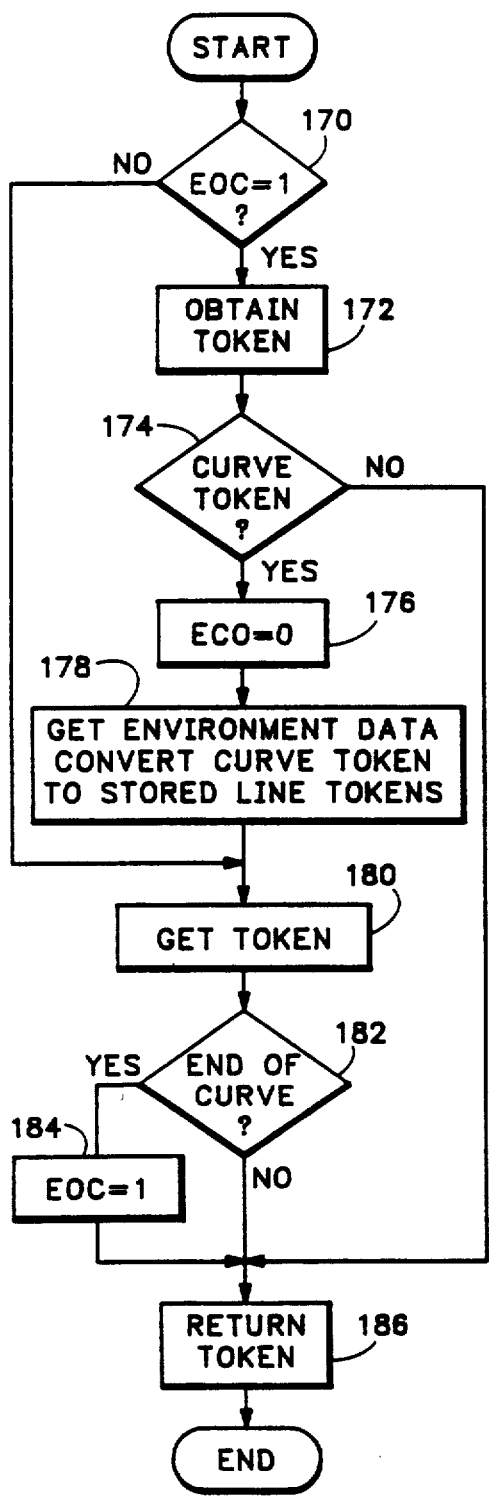
FIG. 9 is a flow chart illustrating operation of a CURVE-FLATTENER routine.

FIG. 9 illustrates a "CURVE-FLATTENER" routine for converting a Curve token describing a curved line to a series of Line tokens describing a set of straight lines approximating the curved line. When called, the CURVE-FLATTENER routine checks an end of curve (EOC) flag bit stored in RAM 122 of FIG. 1 to determine whether the CURVE-FLATTENER routine has completely processed the last acquired Curve token (step 170). If the flag is true (a logical "1"), the CURVE-FLATTENER routine obtains an input token (step 172) by consulting a particular entry in the table 144 and calling another routine to supply the input token. The CURVE-FLATTENER routine then determines if the token is a Curve token (step 174). If not, the CURVE-FLATTENER rountine returns the token (step 186) and terminates operation. However, if the token is a Curve token (step 174), the CURVE-FLATTENER routine sets the EOC flag false (logical "0") (step 176), converts the Curve token into a sequence of Line tokens and an End of Curve token, and stores these tokens RAM 122 of FIG. 1 (step 178). In the course of carrying out step 178, the CURVE-FLATTENER routine consults the environment data structure to determine how long it should make each straight line.

Thereafter, the CURVE-FLATTENER routine reads a token back out of RAM 122 (step 180) and checks whether the token is the End of Curve token (step 182). If the token is instead a Line token, the CURVE-FLATTENER routine returns the token and terminates (step 186). When next called, the CURVE-FLATTENER routine checks the EOC flag (step 170) and finds EOC to be false. In such case, the CURVE-FLATTENER routine skips to step 180. The CURVE-FLATTENER routine continues to bypass steps 172-178 and to successively return each Line token stored in memory until at step 182, it encounters the End of Curve token. At this point the CURVE-FLATTENER routine sets the EOC flag true (step 184) and returns the End of Curve token to the invoking routine (step 186). When next called, the CURVE-FLATTENER routine obtains and processes another input Curve token at steps 172-178.

Figure 10:
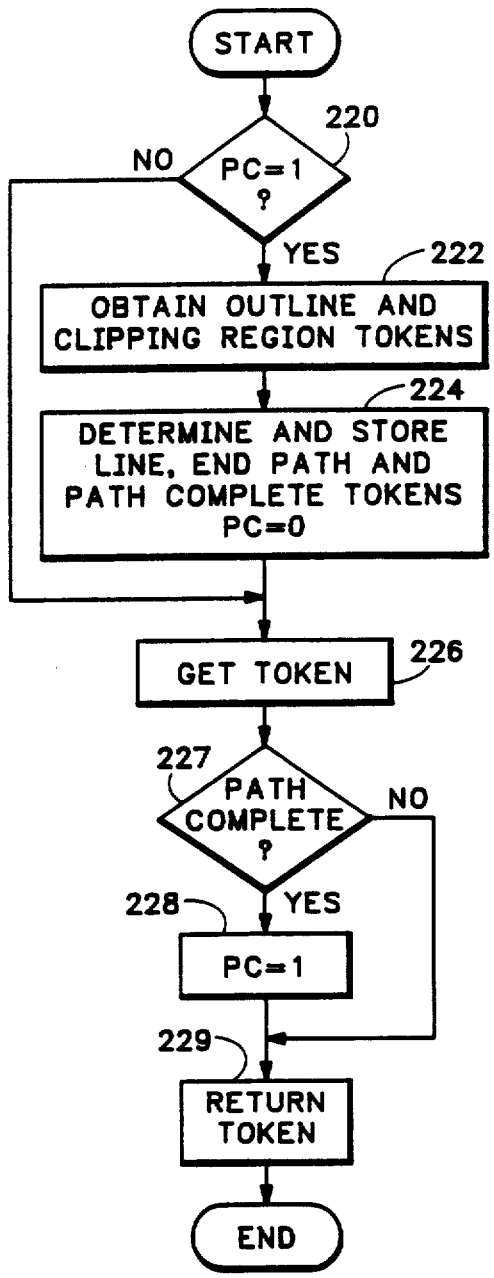
FIG. 10 is a flow chart illustrating operation of a CLIPPER routine.

FIG. 10 illustrates a "CLIPPER" routine. The CLIPPER routine requests input tokens representing the outline of an area to be drawn and the outline of the current clipping region and returns a series of Line, End Path, and Path Complete tokens representing the shape of an area of intersection of the graphic path and clipping path regions. When called, the CLIPPER routine checks a path complete flag (PC) stored in RAM 122 of FIG. 1 to determine whether the flag is true (step 220). If so, the CLIPPER routine obtains its input tokens, determines and stores output tokens including Line tokens and a Path Complete token representing the area of intersection, and sets the PC flag false (step 224). The CLIPPER routine thereafter reads a first output token out of memory (step 226) and determines whether the token is a Path Complete token (step 227). If not, the CLIPPER routine returns the token to its invoking routine (step 229) and terminates operation. Thereafter, when subsequently called, the CLIPPER routine detects a false PC flag (step 220), skips to step 226, reads another token out of memory and returns the token to its invoking routine. The CLIPPER routine continues to read and return a stored output token whenever called until it encounters a Path Complete token at step 227. At this point, it sets the PC flag true (step 228) and returns the Path Complete token to the invoking routine (step 229). When next called, the CLIPPER routine finds the PC flag true (step 220) and repeats steps 222 and 224 before going on to step 226.

Figure 11:
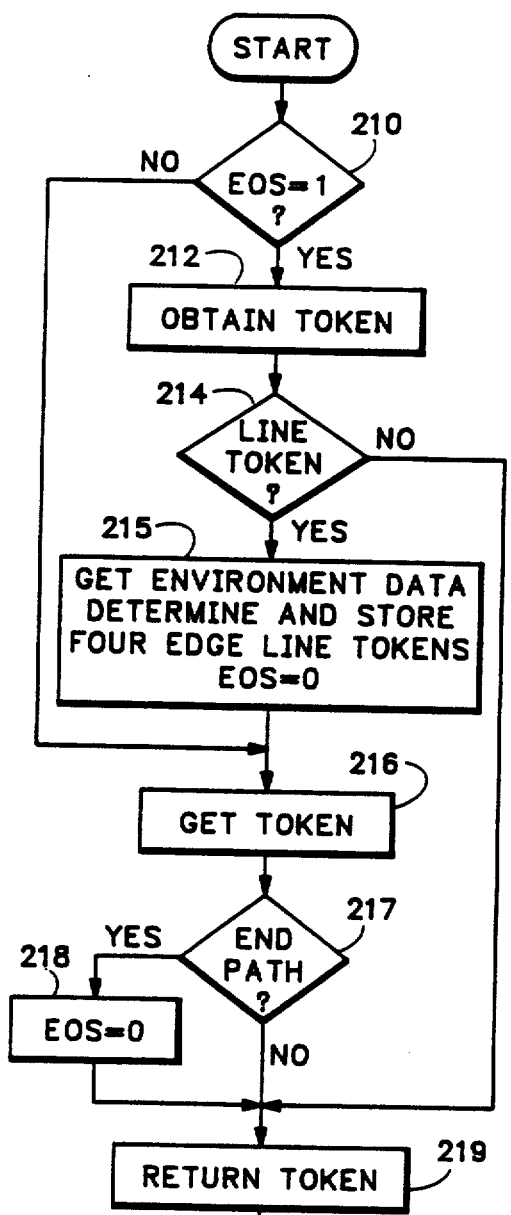
FIG. 11 is a flow chart illustrating operation of a STROKER routine.

FIG. 11 illustrates a "STROKER" routine called to convert a single input Line token to four output Line tokens forming edges of a rectangle of length equal to the length of the line described by the input Line token and of width determined by line width data stored in the graphic environment data structure. When called, the STROKER routine checks whether an "EOS" flag is true (step 210) and if so, obtains an input token from a preceding routine (step 212). If the input token received is not a Line token (step 214), the STROKER routine returns its input token (step 219) and terminates operation. However, if the input token is a Line token (step 214), the STROKER routine reads the graphic environment data and produces and stores the four output Line tokens defining the rectangle edges and an End Path token (step 215). Also in step 215, the STROKER routine sets the EOS flag false. The STROKER routine then reads a token out of memory (step 216) and checks whether it is the End Path token (step 217). If the token is instead a Line token, the routine returns the Line token to its invoking routine (step 219) and terminates. When next called, the STROKER routine determines the EOS flag is false (step 210) and skips to step 216, obtaining and returning a next line token from memory. The STROKER routine continues to return stored Line tokens when called until the routine encounters the End Path token at step 217. At that point it sets the EOS flag true (step 218), returns the End Path token (step 219) and terminates.

Figure 12:
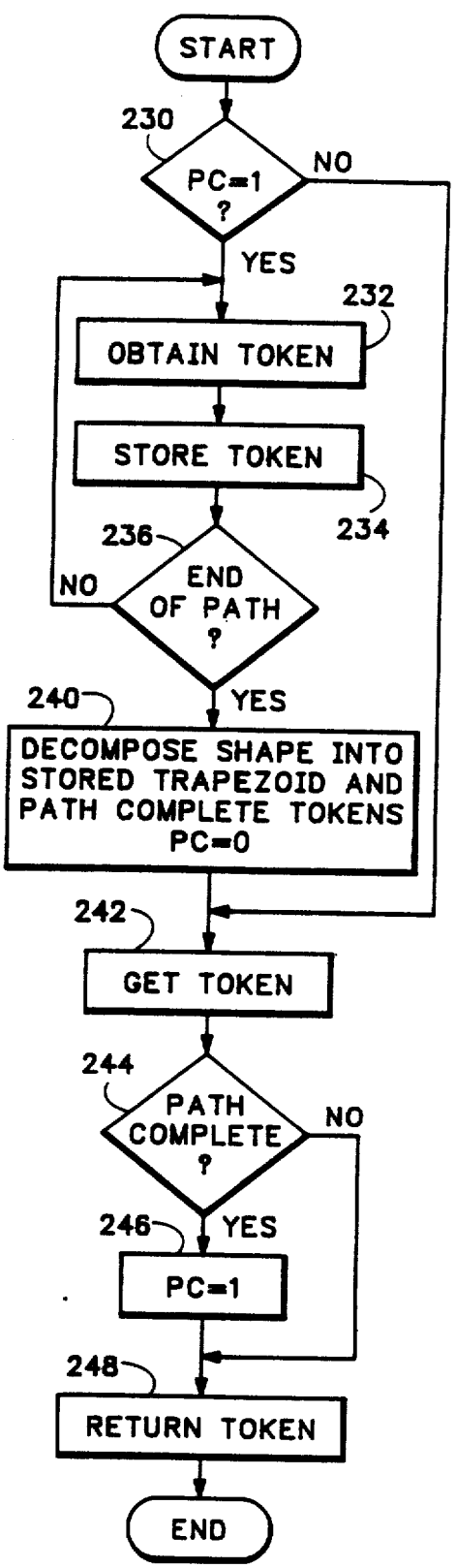
FIG. 12 is a flow chart illustrating operation of a DECOMPOSER routine.

FIG. 12 illustrates a "DECOMPOSER" routine that repeatedly requests Line tokens from another routine until it receives an End Path token. The DECOMPOSER routine "decomposes" a shape defined by the Line tokens into a set of trapezoids and produces a set of output Trapezoid tokens, each defining a separate one of the trapezoids. The DECOMPOSER routine first checks a path complete flag (PC) stored in memory to determine if the flag is true (step 230). If so, the DECOMPOSER routine obtains a token from a preceding routine (step 232), stores the token (step 234) and determines whether the token is an End of Path token (step 236). If not, the DECOMPOSER routine repeats steps 232, 234 and 236 until it encounters an End of Path token at step 236. The DECOMPOSER routine decomposes the shape defined by the tokens stored at step 234 into Trapezoid tokens and stores those tokens in memory along with a Path Complete token (step 240). The DECOMPOSER routine also sets the PC flag false at step 240. The DECOMPOSER routine then reads an output token out of memory (step 242) and checks whether the output token is the Path Complete token (step 244). If not, the DECOMPOSER routine returns the read out Trapezoid token to its invoking routine (step 248) and ends. Thereafter, when subsequently invoked, the DECOMPOSER routine detects the PC flag is false (step 230), skips to step 242, obtains another output token from memory and returns the token to the invoking routine. The DECOMPOSER routine continues to return stored Trapezoid tokens to its invoking routine until it encounters the Path Complete token at step 244. At that point the DECOMPOSER routine sets the PC flag true (step 246) and returns the Path Complete token to the invoking routine (step 248).

Figure 13:
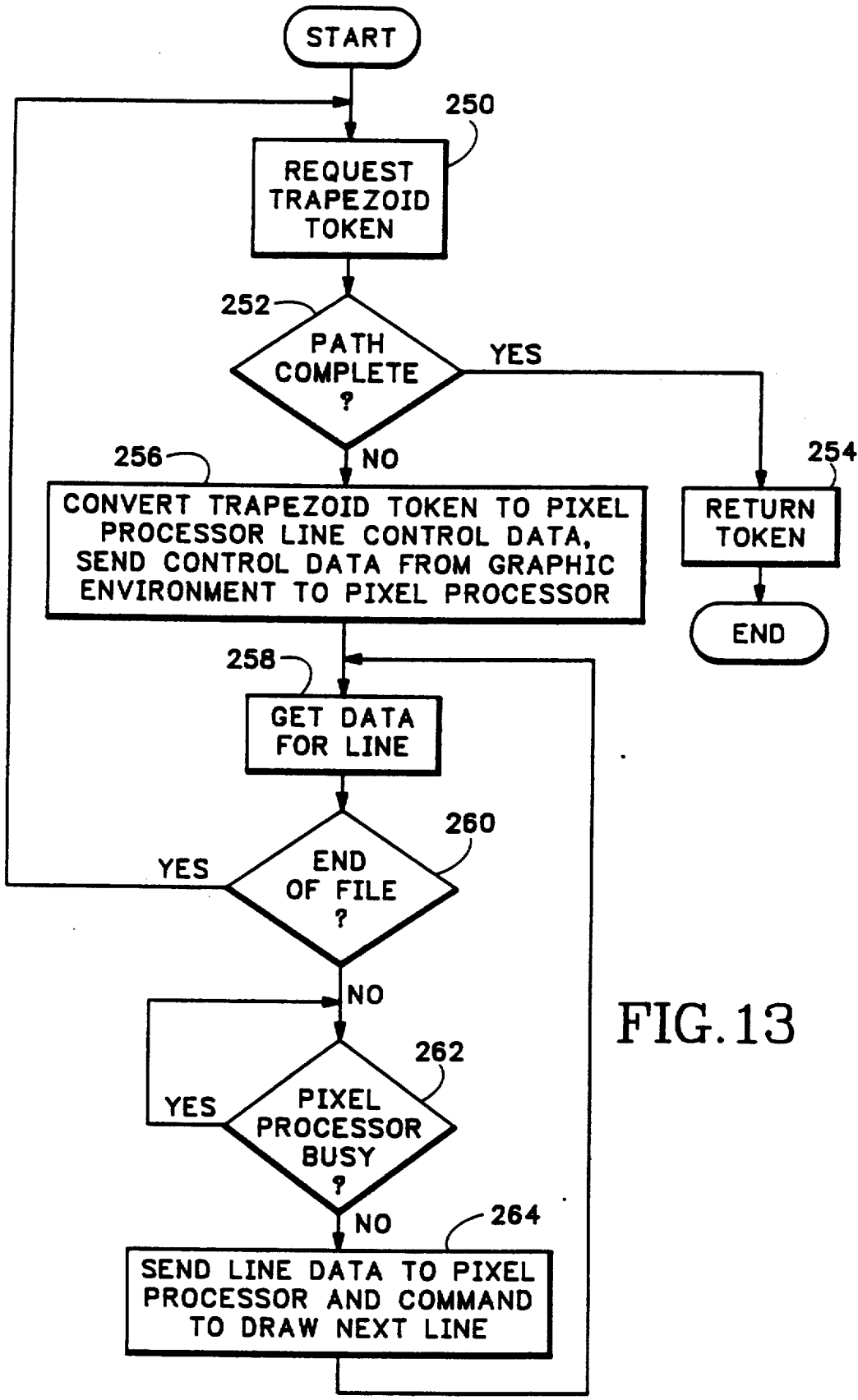
FIG. 13 is a flow chart illustrating operation of a software portion of a PIXELATOR routine.

FIG. 13 illustrates operation of a "PIXELATOR" routine that requests a Trapezoid token from a preceding routine, converts the token and various graphic environment data into data describing a set of parallel lines of pixels forming a trapezoid and sends the data for each line in succession to the pixel processor. The pixel processor converts data describing each line into pixel data stored in the bit map.

When invoked, the PIXELATOR routine requests a Trapezoid token from a preceding routine (step 250), but if the preceding routine returns a Path Complete token (step 252), the PIXELATOR routine simply returns the Path Complete token to its invoking routine (step 254) and terminates. Otherwise, the PIXELATOR routine converts the received Trapezoid token into data defining a set of parallel pixel lines forming the trapezoid and stores that data (step 256). Also in step 256 the PIXELATOR routine reads data defining attributes of the line from the graphic environment structure and stores this data in appropriate registers in the pixel processor for controlling subsequent operation of the pixel processor. Thereafter, the PIXELATOR routine retrieves data from the data file (step 258). If the retrieved data is not an end of file (EOF) marker (step 260), the data defines a line forming a portion of the trapezoid. In such case, the PIXELATOR routine arbitrates for access to bus 126 of FIG. 4 and reads a BUSY indicating data bit stored in an addressable register within the pixel processor to determine whether the pixel processor is busy processing the last received line data (step 262). The pixelator continues to execute step 262 until it finds the pixel processor is not busy. At that point it arbitrates for and obtains control of bus 126 of FIG. 4 and transmits the line data to the pixel processor for processing (step 264).

The pixel processor responds by appropriately adjusting appropriate pixel data bits in the bit map to "draw" the line into the bit map such that the line is subsequently printed with a color and halftone intensity determined by the attribute control data previously transmitted to the pixel processor at step 256. The PIXELATOR routine continues to repeat steps 258-264 until it has read out and transmitted all its stored line data to the pixel processor. Upon encountering the end of file marker at step 260, the PIXELATOR routine returns to step 250 to obtain another Trapezoid token. The PIXELATOR routine continues to obtain and process Trapezoid tokens in this manner until it encounters a Path Complete token at step 252.

Figure 14:
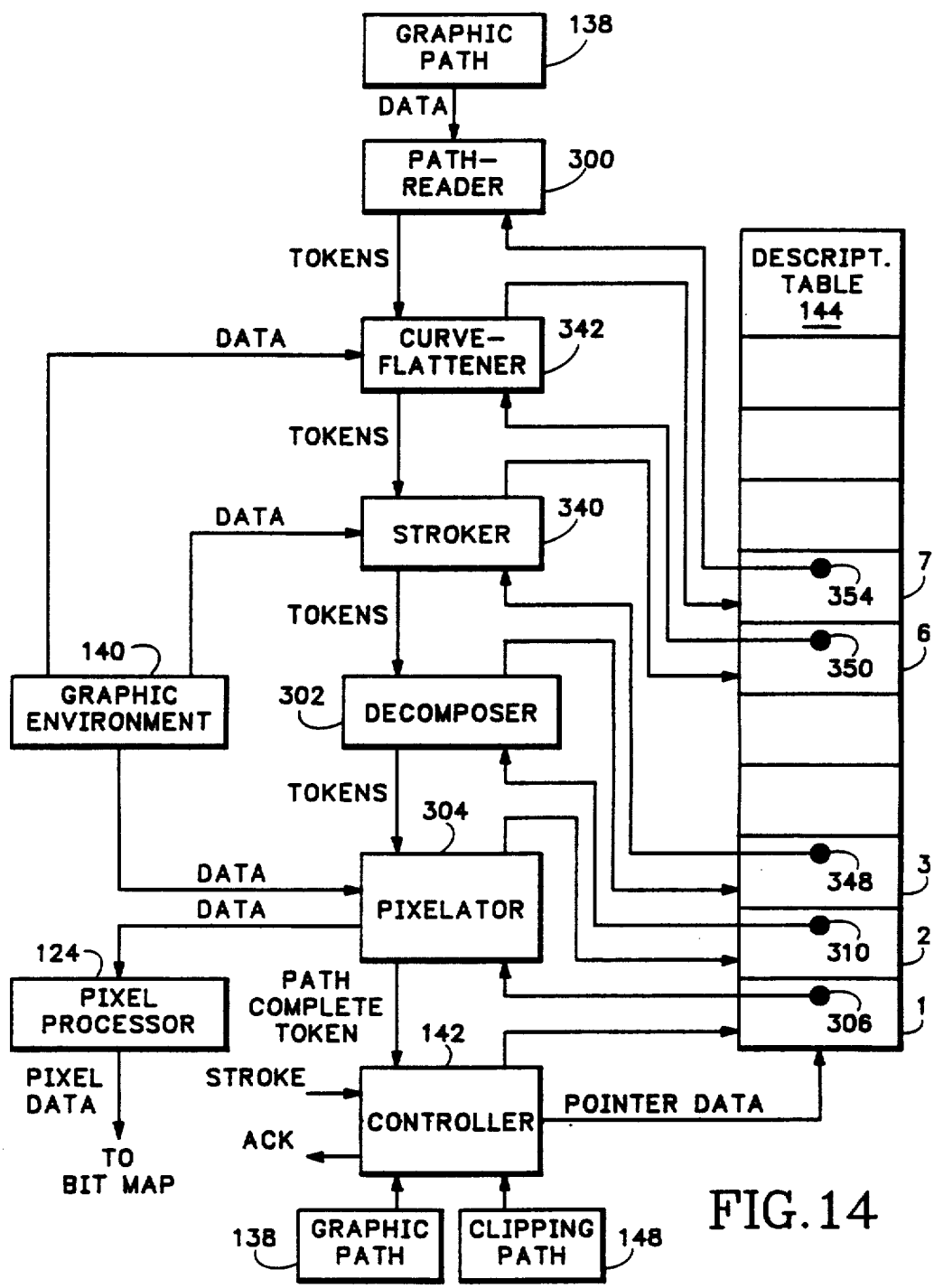
FIG. 14 is a block diagram illustrating data flow through the line generator of FIG. 6 in response to a stoke type paint command.

FIG. 14 by way of example illustrates operation of the line generator 136 of FIG. 6 in response to a stroke type paint command. On receipt of the stroke command, controller 142 initially checks the graphic path data 138 and the clipping path data 148 and discovers the line generator must process curved lines but need not clip the graphic object to fit with the clipping area. Thereafter, controller 142 stores pointers in table 144 including a pointer 306 in an entry 1 pointing to the PIXELATOR routine 304 and a pointer 310 in an entry 2 pointing to the DECOMPOSER routine 302. The controller stores in entry 3 a pointer 348 to STROKER routine 340, in entry 6 a pointer to the CURVE-FLATTENER routine 342 and in entry 7 a pointer 354 referencing PATH-READER routine 300.

After adjusting the pointers in table 144, the controller 142 consults entry 1 and invokes operation of the PIXELATOR routine 304 referenced by pointer 306. The PIXELATOR routine 304 always checks table entry 2 when called and here finds the pointer to DECOMPOSER routine 302. The PIXELATOR routine then calls the DECOMPOSER routine 302 which consults table entry 3 to locate its source of input tokens. The DECOMPOSER routine repeatedly calls the STROKER routine 340 which consults entry 6 and calls the referenced CURVE-FLATTENER routine 342 to obtain input Line tokens. The CURVE-FLATTENER routine in turn calls the PATH-READER routine 300 to acquire Tokens defining the graphic path. The PATH-READER routine acquires path data from the graphic path data structure 138 and returns the appropriate Line and Curve tokens to the CURVE-FLATTENER routine. The CURVE-FLATTENER routine simply returns its input Line tokens to the STROKER routine but processes input Curve tokens to produce a set of approximating Line tokens sequentially returned to the STROKER routine, consulting the graphic environment data structure 140 to determine how many straight Line tokens to employ when approximating the curved line indicated by its input Curve token.

The STROKER routine 340 converts each input Line token to a set of four output Line tokens describing edges of a rectangle of length equal to the length of the line referenced by the input Line token and of width indicated by graphic environment data. On repeated calls, the STROKER routine 340 returns each set of four output Line tokens to the DECOMPOSER routine 302 for processing into Trapezoid tokens returned to the PIXELATOR routine 304. The PIXELATOR routine obtains and sends data from the graphic environment data structure 140, to the pixel processor 124, converts input Trapezoid tokens into line data, and sends the line data to the pixel processor 124. When the PIXELATOR routine 304 receives a Path Complete token, it forwards the token to controller 142 which returns a message to the graphic system interface of FIG. 4 acknowledging execution of the stroke command.

FIGS. 15A–15E comprise a flow chart illustrating operation of controller 142 of FIG. 6 in response to a paint command. Starting at step 301, the controller determines whether the clipping path is rectangular and whether the graphic path bounding box is inside the clipping path bounding box (step 303). If so, the controller sets a CR (clipping required) flag false (step 305). If the clipping path is not rectangular (step 301) or its bounding box is not inside the clipping path bounding box (step 303), the controller sets the CR flag true (step 307). The controller maintains a record of all routines to be called in a "stage list", a file stored in memory, and after appropriately setting the CR flag, the controller initially nulls all entries in the stage list (step 309).

If the paint command requests a clip operation (step 311), the controller sets a "controller" entry in the description table to point to the CLIPPATH-WRITER routine (step 313) and adds the CLIPPATH-WRITER routine to the stage list (step 315). (The controller calls the routine pointed to by the controller entry when subsequently initiating data processing.) If the CR flag is true (step 317), the controller sets the entry referenced by the CLIPPATH-WRITER routine to point to the CLIPPER routine (step 319) and adds the CLIPPER routine to the stage list (step 321). The controller then sets the description table entry referenced by the CLIPPER routine when seeking a source of clipping path tokens such that the entry points to the CLIPPATH-READER routine (step 323). The controller also adds the CLIPPATH-READER routine to the stage list (step 325).

The controller thereafter checks the graphic path data structure to determine if the graphic path includes any curved lines (step 333). If not, the controller sets the description table entry accessed by the CLIPPER routine when seeking input tokens so that the entry points to the PATH-READER routine (step 347). However on detecting curves in the graphic path at step 333, the controller sets that description table entry to point to the CURVE-FLATTENER routine (step 335), adds the CURVE-FLATTENER routine to the stage list (step 337), and places a pointer to the PATH-READER routine in the description table entry read by the CURVE-FLATTENER routine when seeking input tokens (step 339). After step 339 or after step 347, the controller adds the PATH-READER routine to the stage list (step 341) and initializes any temporary data structures in memory utilized by routines on the stage list (step 343). The controller then calls the routine referenced by the controller entry of the description table (step 344). When the line generator has completed processing the input data, the controller calls an ABORT ENTRY routine for each routine referenced by the stage list (step 345). This routine deallocates memory utilized by the various routines to store temporary data structures. The controller routine then returns to the graphic system interface routine.

If the CR flag is not true at step 317 (FIG. 15B), the controller determines if there are any curves in the path (step 327), and if not sets the description table entry checked by the CLIPPATH-WRITER routine to point to the PATH-READER routine (step 331). If the controller finds curved lines in the path at step 327, it sets the description table entry referenced by the CLIPPATH-WRITER routine to point to the CURVE-FLATTENER routine (step 329). Following steps 329 or 331, the controller continues operation at steps 337 or 341, respectively, as described hereinabove.

Figure 15E:
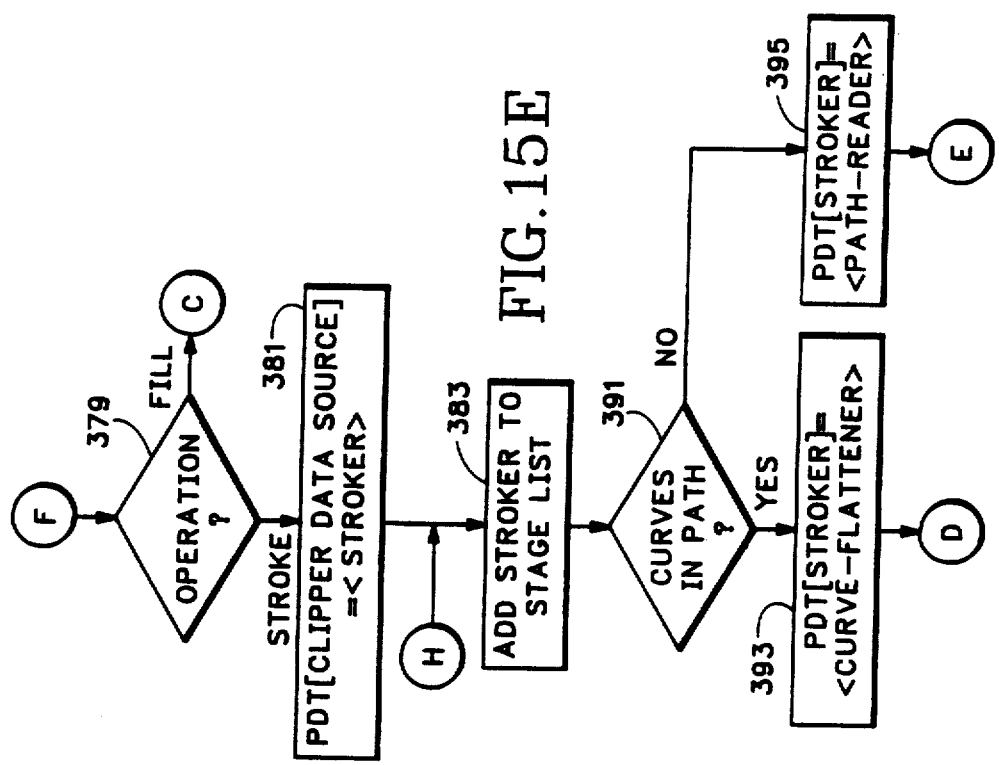
FIGS. 15A-15E comprise a flow chart illustrating operation of the controller of FIG. 6.
Figure 15A:
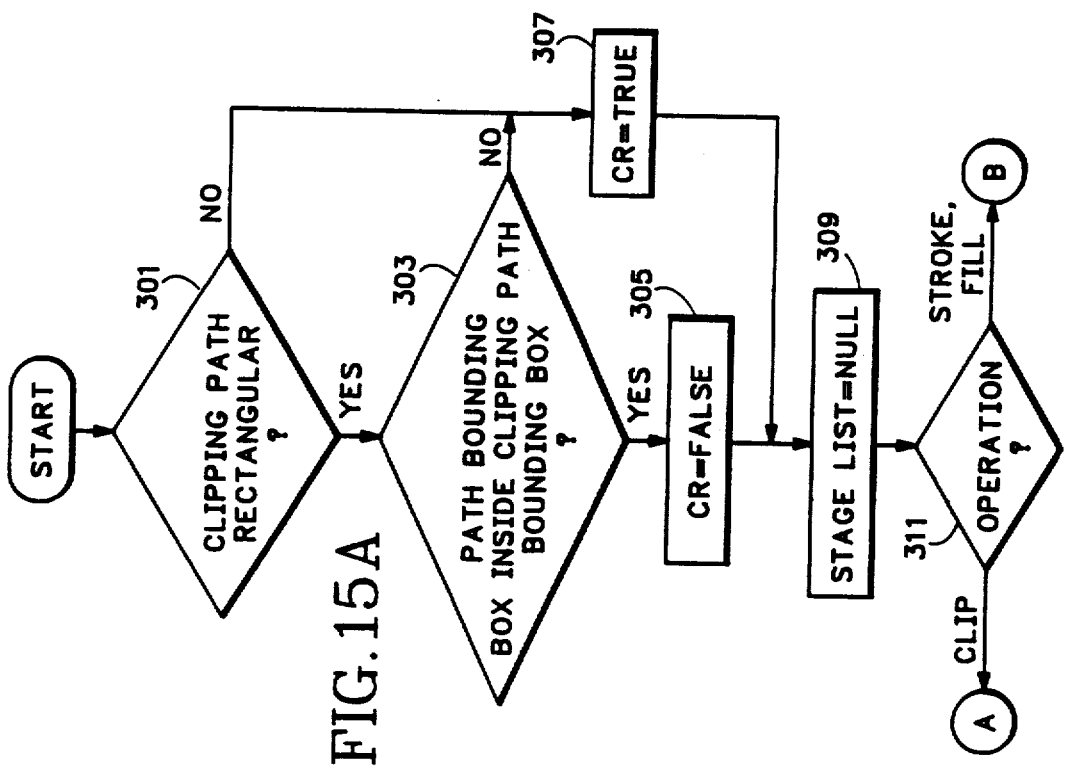
Figure 15B:
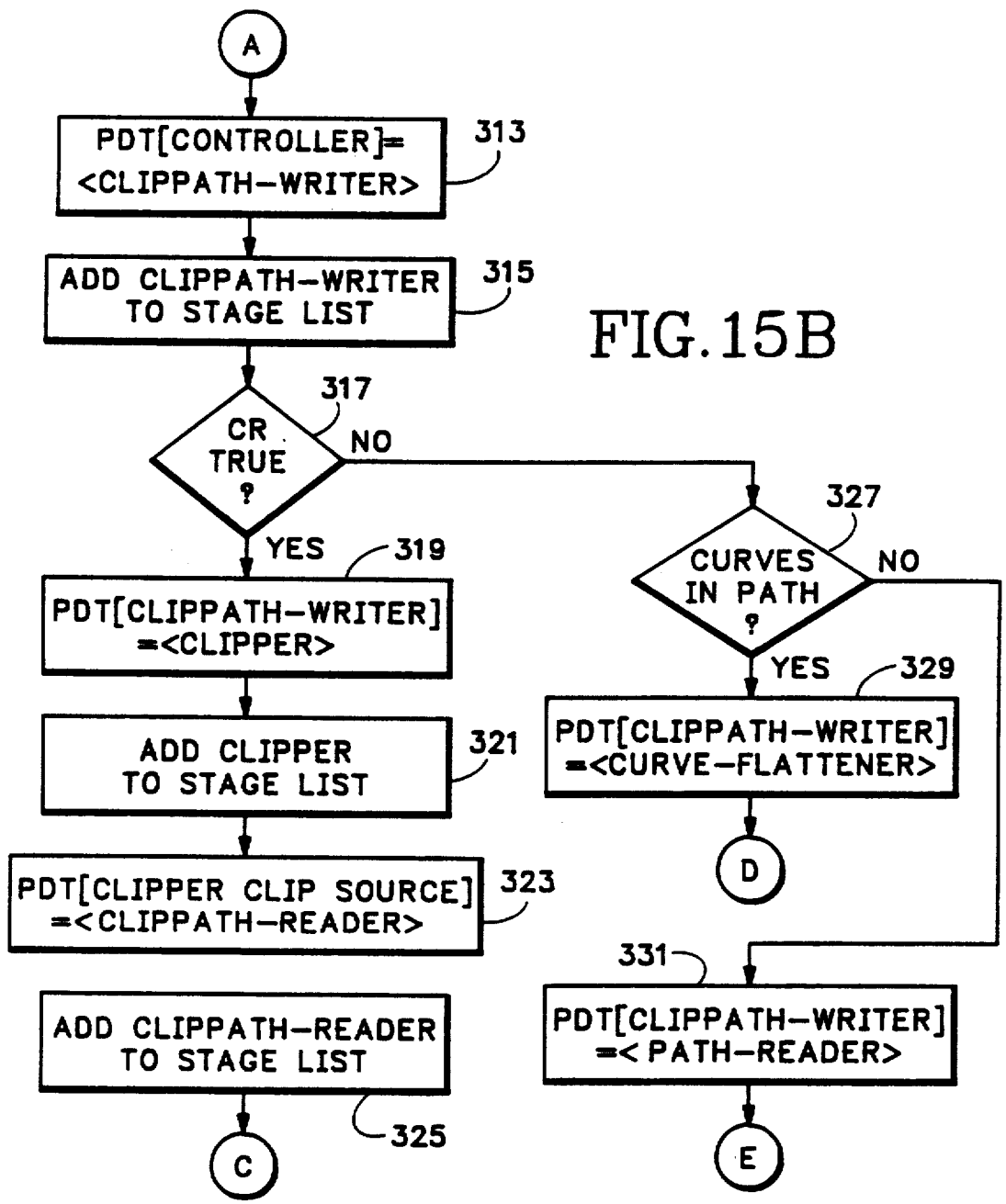
Figure 15C:
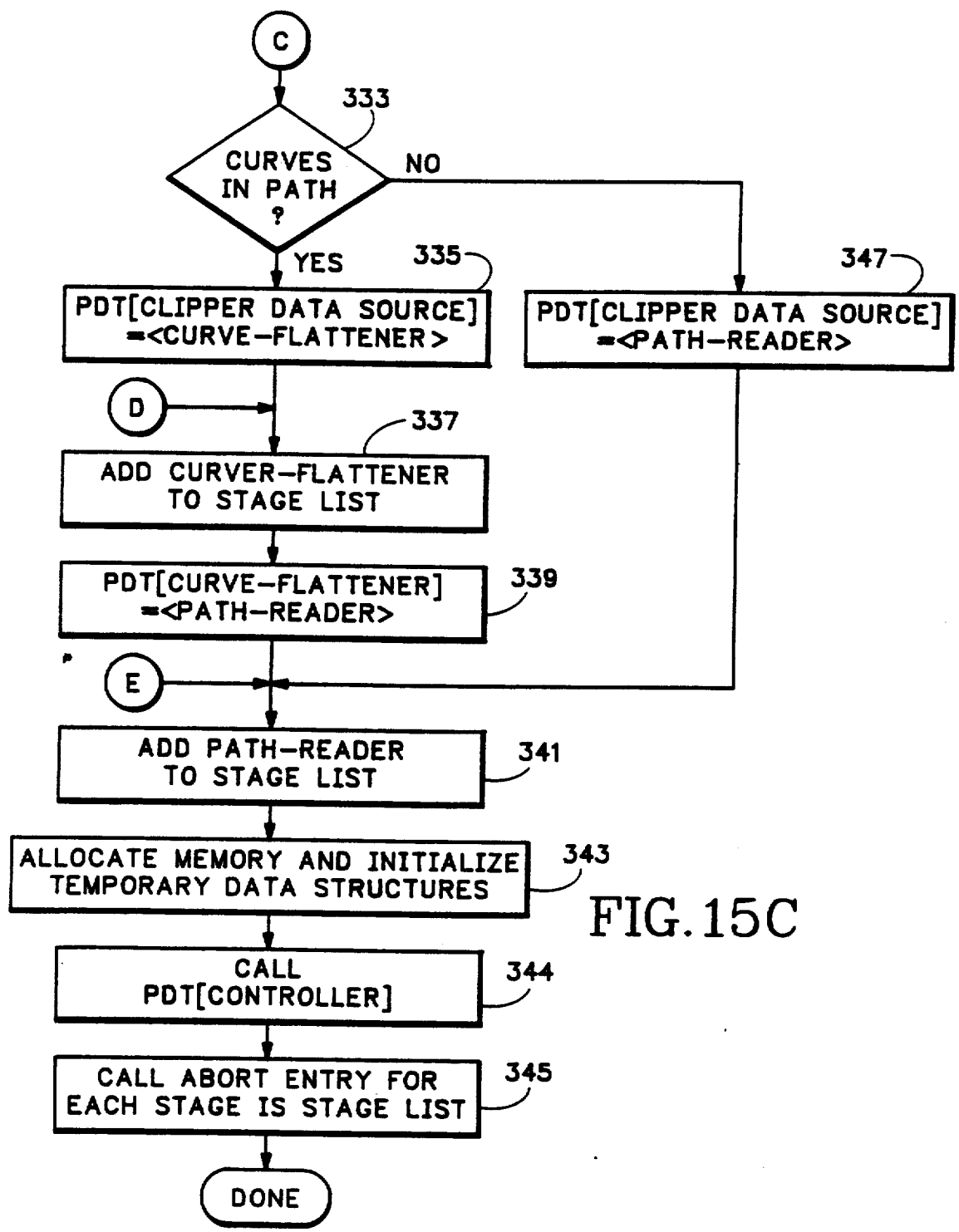

If the input paint command requests a stroke or fill operation at step 311 FIG. 15A, the controller sets the controller entry in the description table to point to the PIXELATOR routine (step 349, FIG. 15D), adds the routine to the stage list (step 351), sets the table entry referenced by the PIXELATOR routine to point to the DECOMPOSER routine (step 353), and adds the DECOMPOSER routine to the stage list (step 355). If CR is true (step 357) the controller sets the entry referenced by the DECOMPOSER routine to point to the CLIPPER routine (step 359), adds the CLIPPER routine to the stage list (step 361), places a pointer to the CLIPPATH-READER routine in the description table entry accessed by the CLIPPER routine (step 363), and adds the CLIPPATH-READER routine to the stage list (step 365).

The controller then determines whether the paint command requests a fill operation (step 379, FIG. 15E), and if so, continues at step 333 (FIG. 15C) in a manner described hereinabove. However, if the paint command requests a stroke operation (step 379) the controller places a pointer to the STROKER routine in the description table entry referenced by the CLIPPER routine (step 381) and adds the STROKER routine to the stage list (step 383). The controller then checks the graphic path data structure to determine whether the graphic path includes curved lines (step 391). If so, the controller sets the description table entry referenced by the STROKER routine to point to the CURVE-FLATTENER routine (step 393) and continues at step 337 of FIG. 15C. If the controller finds no curves in the graphic path at step 391 of FIG. 15E, it stores a pointer to the STROKER routine in the description table entry consulted by the PATH-READER routine (step 395) and resumes operation at step 341 of FIG. 15C.

Figure 15D:
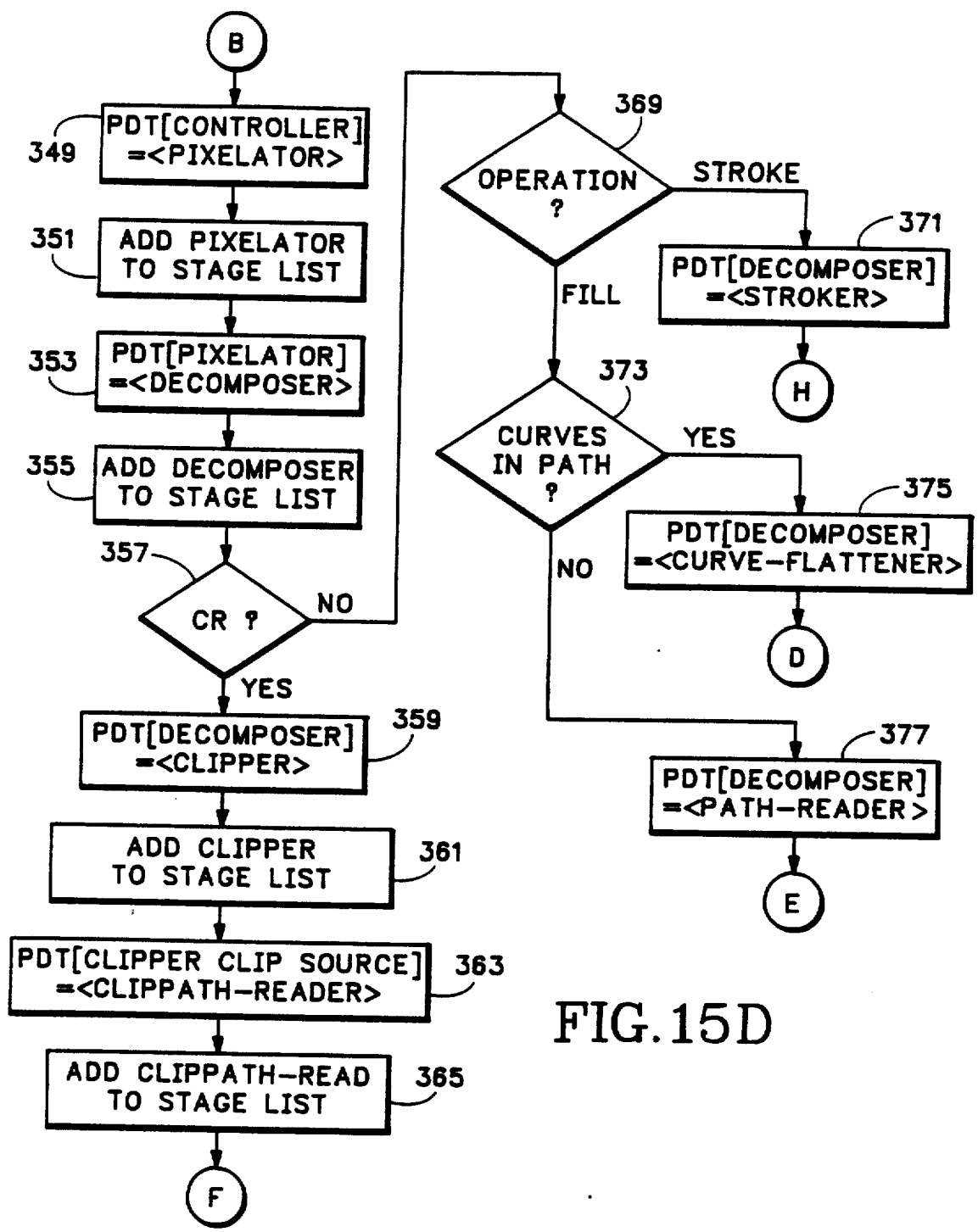

Referring to FIG. 15D, if the CR flag is false at step 357, and the input paint command requests a stroke operation (step 369), the controller places a pointer to the STROKER routine in the description table consulted by the DECOMPOSER routine and moves on to step 383 of FIG. 15E, continuing therefrom as described hereinabove. However, if at step 369 the controller finds that the paint command requests a fill operation, the controller checks the graphic path data structure to determine whether the graphic path includes any curved lines (step 373). If the path includes curved lines, the controller sets the description table entry referenced by the DECOMPOSER routine to point to the CURVE-FLATTENER routine (step 375) and moves to step 337 of FIG. 15C. If the controller finds no curves in the graphic path at step 373, it stores a pointer to the PATH-READER routine in the description table entry consulted by the DECOMPOSER routine (step 377) and continues operation at step 341 of FIG. 15C.

The pixel processor 124 of FIG. 4 implements the second stage of the picture processing pipeline of the present invention. The pixel processor uses a half tone scheme to give printed objects differing apparent color intensities based on intensity control data provided by the PIXELATOR routine. FIGS. 22A-22D illustrate half toning whereby pixels forming a graphic page are mapped into an array of half tone cells. FIG. 22A illustrates three horizontally adjacent half tone cells 406 of such an array, each comprising a rectangular array of pixels 408. Each pixel 408 of a half tone cell 406 has an assigned intensity threshold level represented in FIG. 22A by a number superimposed thereon. All half tone cells are similar in size and shape and pixels similarly positioned within arrays forming different half tone cells are assigned the same intensity threshold level.

Each graphic object included in a graphic design also has an assigned intensity level, for example, from 1 to 100. If the intensity level associated with a pixel within the bounds of an object is less than the intensity level of the object, the pixel turns on. FIG. 22B illustrates how a graphic object, here a line of intensity 100, is printed across the three half tone cells of FIG. 22A. Since all pixels of each half tone cell have assigned intensity levels less than 100, all pixels in the path of the line turn on. FIG. 22C illustrates a similarly directed line of intensity 50. Since the line of FIG. 22C includes fewer pixels than the line of FIG. 22B, the line of FIG. 22C appears less intense in color, fainter, than the line of FIG. 22B. FIG. 22D illustrates a line of intensity 75 drawn across the three half tone cells.

Three-color dot matrix printers generate color pictures by printing pixels in three primary colors, for example cyan, magenta, and yellow. The printed page is organized into three overlapping pixel arrays, each array including pixels of a separate one of the primary colors. Multiple color half toning is generally similar to monochrome half toning, as illustrated in FIGS. 22A-22D, except each graphic object printed has a different intensity level associated with each of the three primary colors.

Figure 23A:
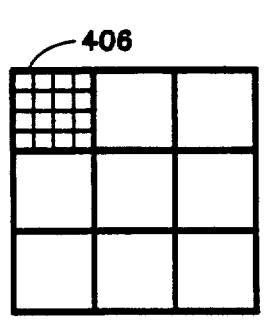
FIGS. 23A-23C illustrate half tone cell offset.
Figure 23B:
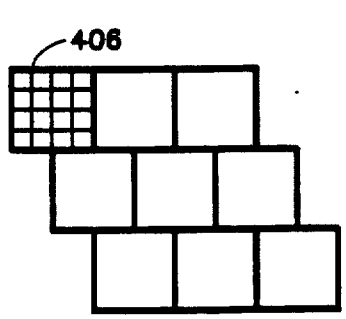
Figure 23C:
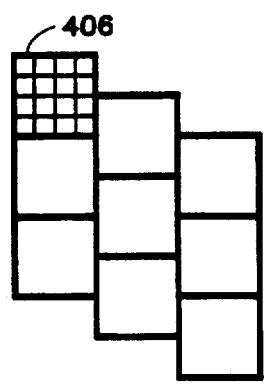

Pixel half tone cells may be vertically or horizontally offset. FIG. 23A illustrates relative positioning of nine cells 406 of a half tone cell array having no offset. FIG. 23B illustrates an alternative arrangement of the same nine cells when the half tone cell array has a horizontal offset of, for example, +2 pixels. That is, each row of half tone cells is offset from the next row above by two pixels in a +X direction (i.e., to the right in FIG. 23B). FIG. 23C shows the same nine cells when the half tone cell array has a vertical offset of −1 (in a −Y direction).

Before transmitting a picture description to main processor 118, the graphic design system 110 of FIG. 4 stores set-up data in addressable registers of pixel processor 124. The set-up data indicates monochrome or multiple (three or four) color mode of operation, the amount and direction of cell offset, half tone cell dimensions and intensity threshold levels. The pixel processor uses the control data to determine the desired half tone scheme when subsequently converting line descriptions to pixel data.

Figure 16:
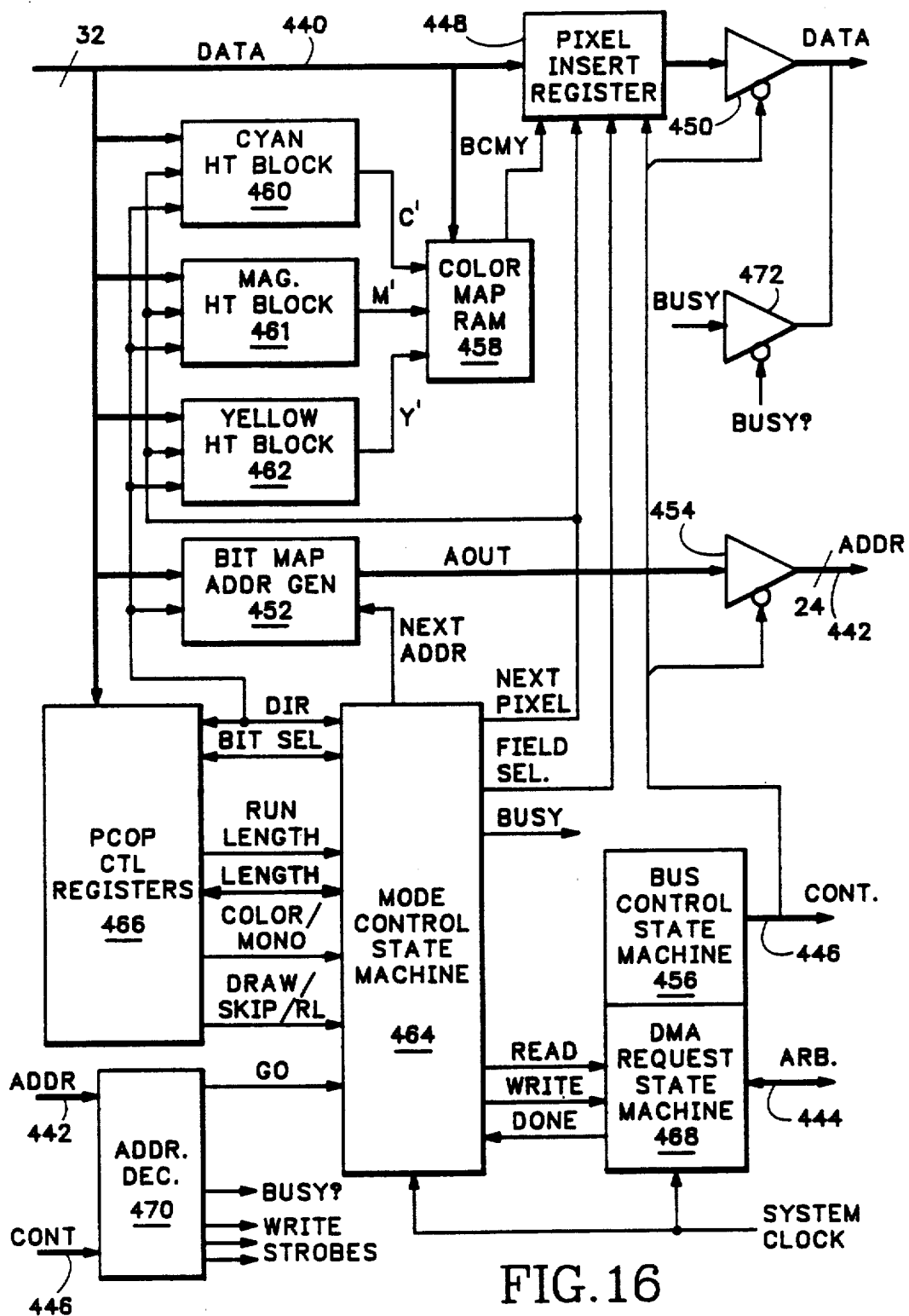
FIG. 16 illustrates the pixel processor of FIG. 4 in more detailed block diagram form.

FIG. 16 illustrates the pixel processor 124 of FIG. 4 in more detailed block diagram form. Bus 126 of FIG. 4 is the standard bus for the Motorola model 68020 microprocessor and includes a 32-bit data bus 440, a 24-bit address bus 442, a set of bus arbitration lines 444, and bus control lines 446. A pixel insert register 448 stores each pixel data word read out of RAM 122 of FIG. 4 via data bus 440. When processing line data, the pixel processor adjusts states of one or more bits of the pixel data word stored in pixel insert register 448 and thereafter places the word back on data bus 440 via a tristate buffer 450 to write the data word back into the bit map. During both read and write operations, a bit map address generator 452 places the appropriate RAM address on address bus 442 via a tristate buffer 454. A bus control state machine 456 clocked by a system clock signal generates the appropriate control signals on bus control lines 446 to implement the memory read or write cycle.

The states of up to four selected data bits of a pixel data word stored in pixel insert register 448 are simultaneously set in accordance with states of output data bits B, C, M, and Y produced by a color map RAM 458 in response to input bits from cyan, magenta and yellow half tone blocks 460, 461 and 462, respectively. For a monochrome printer, only one bit of the pixel data word is adjusted at a time to a state indicated by the C output bit of RAM 458. For a three or four color printer, the pixel processor simultaneously sets three or four bits of the pixel data word in accordance with the RAM 458 output bits.

Each half tone block 460–462 stores set-up data indicating intensity threshold levels of the half tone cell for the corresponding primary color and also stores control data indicating the intensity level for a line being processed. For each cyan pixel along the path of a line, cyan half tone block 460·determines the position of the pixel within the half tone block, compares the threshold level of the pixel with the desired intensity level of the line, and generates its output bit C′ indicating whether the intensity threshold level is less than the desired line intensity. The magenta and yellow half tone blocks 461 and 462 are identical to the cyan half tone block 460 but store intensity threshold data for the magenta and yellow half tone cells and generate M′ and Y′ output bits indicating on/off states of adjacent magenta and yellow pixels. The C′, M′ and Y′ bits address color map RAM 458 which reads out a four bit data word BCMY. The graphic design system 110 of FIG. 4 loads set up data into the color map via data bus 440 to adjust for differences in color schemes used by printers.

A mode control state machine 464 clocked by system clock signal responds to data stored in a set of control registers 466 indicating line direction (DIR), line length (number of pixels), color or monochrome mode (i.e., whether the printer is three or four color or monochrome), and draw, skip or run length mode. A 5-bit PIXEL SELECT field stored in control registers 466 tells the mode control state machine 464 which bit or set of bits within the data word in pixel insert register 448 to process. The mode control state machine 464 generates a FIELD SELECT output signal to select the particular bit or bits of the 32-bit pixel data word stored in pixel insert register 448 to be set in accordance with the current color map RAM 458 output.

The mode control state machine 464 also transmits a "next address" signal to bit map address generator 452 whenever the pixel processor is to read a pixel data word out of the bit map and store the word in pixel insert register 448. In response, the bit map address generator 452 alters its current address output AOUT to buffer 454 to select the pixel data word containing the next pixel in the line path. State machine 464 transmits a READ request signal to a DMA (direct memory access) request state machine 468, also clocked by the system clock signal. (State machines 456 and 468 together carry out the function of a bus master 21 of FIG. 2.) State machine 468 uses arbitration lines 444 to obtain control of bus 126 of FIG. 4 in a well-known manner. When state machine 468 obtains control of the bus, the state machine transmits a read request signal to bus control state machine 456. State machine 456 sets buffer 454 to place the AOUT address on address bus 442 and transmits control signals on control lines 446 causing RAM 122 to read out onto data bus 440 the pixel data word at that address and causing pixel insert register 448 to store the pixel data word. Thereafter, the bus control state machine 456 returns a signal to DMA request state machine 468 indicating that it has completed the requested read operation. State machine 468 thereupon transmits an acknowledge (ACK) signal back to mode control state machine 464.

At this point the mode control state machine begins transmitting NEXT PIXEL signal pulses to each half tone block 460–462 and to pixel insert register 448. Each NEXT PIXEL pulse tells the half tone blocks to compare the intensity threshold data for a next pixel along the path of the line with the desired intensity level of the line and to set output bits C', M' and Y' to appropriate states. Each NEXT PIXEL pulse tells the pixel insert register to store one or more of the current output bits of color map RAM 458 in place of one or more bits of the pixel data word stored in the pixel insert register. The FIELD SELECT signals select the bit or bits of the pixel data word replaced. The mode control state machine 464 sets the FIELD SELECT signals in concert with the NEXT PIXEL pulses such that successive outputs of the color map RAM replace successive bits of the pixel data word.

When all bits controlling pixels in the line path are appropriately adjusted within the pixel data word stored in pixel insert register 448, the mode control state machine 464 transmits a WRITE request signal to DMA request state machine 468. State machine 468 gains control of the system bus and requests the bus control state machine 456 to write pixel data into the bit map RAM. Bus control state machine 456 sets buffer 450 to place the pixel data content of pixel insert register 448 on data bus 440, sets buffer 454 to again place the address output AOUT of address generator 452 on address bus 442, and then asserts control signals on line 446 to write the pixel data on data bus 440 back into RAM 122 of FIG. 4. Thereafter, bus control state machine 456 turns off buffers 450 and 454 and returns an acknowledge signal to DMA request state machine 468. DMA request state machine 468 again transmits the ACK signal to mode control state machine 464 to announce the pixel data word was written back into memory. If the pixel processor has not yet processed all pixels of the line, mode control state machine 464 initiates another pixel data word read/modify/write cycle by transmitting another NEXT ADDRESS signal pulse to the bit map address generator 452. The process continues until all pixel data words containing pixels along the path of the line have been read, modified, and written back into the bit map memory.

At the beginning of each read/modify/write cycle, the bit map address generator 452 generates the pixel data word addresses for read/modify/write operations. The PIXELATOR routine of FIG. 13 may alter the output address of address generator 452 by supplying a new address via data bus 440 as the "origin" part of the description of a line to be drawn. If a bit corresponding to the origin pixel of line is included in the same pixel data word as a bit corresponding to the endpoint pixel of a last drawn line, the PIXELATOR routine of FIG. 13 processor need not alter the address output of the address generator.

The direction data bits DIR stored in control registers 466 provide input to address generator 452. The address generator includes an arithmetic logic unit selectively incrementing or decrementing the last AOUT address by a predetermined step amount to generate a new address output AOUT in response to each NEXT ADDRESS pulse. The DIR data controls how the address is incremented or decremented. The DIR data includes four bits $+X$, $-X$, $+Y$ and $-Y$. If only the $+X$ bit is set, the line extends horizontally to the right of its origin. If only the $-X$ bit is set, the line extends to the left. If the $+X$ and $+Y$ bits are set, the line extends to the right of its origin at a 45 degree angle from horizontal. Thus, it will be appreciated that four direction bits may represent any of eight line directions. If the line extends horizontally in the $-X$ or $+X$ directions, the address generator 452 decrements or increments the address by one. If the line extends vertically in the $-Y$ or $+Y$ directions, the address generator decrements or increments the address by M, where M is the fixed number of pixel data words controlling pixels along one horizontal (X) line of the page. If the line extends to the left or right of its origin at a $+45$ or $-45$ degree angle from horizontal, the address generator increments or decrements the address by $M+1$ or $M-1$ depending on line direction. The printer controller maps pixel data words in the bit map onto the page in a manner consistent with this scheme.

The half tone blocks 460–462 include addressable storage devices for receiving coordinate data from the PIXELATOR routine of FIG. 13 via data bus 440 indicating the position within their respective half tone cells of a pixel at the origin of a line. The coordinate data tells the half tone block which intensity threshold value to assign to the pixel at the origin of the line. As each half tone block receives each NEXT PIXEL pulse the half tone block updates the pixel coordinate data so that it points to a new intensity value for a next pixel in the path of the line in accordance with the stored half tone cell data. During system set up, the graphic design system 110 of FIG. 4 supplies each half tone block with offset data indicating how half tone cells are offset, and with data indicating cell dimension and intensity threshold values. The direction bits DIR stored in registers 466 also control the half tone cells 460-462. The direction bits, along with the stored offset and cell dimension data all tell the half tone blocks how to adjust the pixel coordinate data to point to the appropriate next intensity threshold value after processing each pixel.

An address decoder 470 decodes addresses on address bus 442 in response to signals on control lines 446. When the PIXELATOR routine of FIG. 13 transmits data via data bus 440 to a control register 466, to a half tone block 460-462, or to bit map address generator 452, it places an appropriate address on the address bus 442 and asserts signals on control lines 446. These signals cause address decoder 470 to transmit an output pulse enabling the register or device to receive the data. One particular address on address bus 442 tells the address decoder to transmit a GO signal to mode control state machine 464. This signal tells state machine 464 to start processing a line.

The mode control state machine 464 carries out the function of register 25 of FIG. 2 by providing a BUSY bit as input to a buffer. While the pixel processor is actively processing pixel data for a line, the mode control state machine 464 continues to assert the BUSY output bit. When the PIXELATOR routine wishes to transmit data to the pixel processor, it periodically checks whether the pixel processor is busy by causing address decoder 470 to assert an output BUSY? signal causes buffer 472 to place the BUSY bit on a line of the data bus 440. Thus address decoder 70 carries out the function of decoder 27 of FIG. 2. The state of the BUSY bit on data bus 440 tells the PIXELATOR routine when the pixel processor has completed processing a line.

Figure 17:
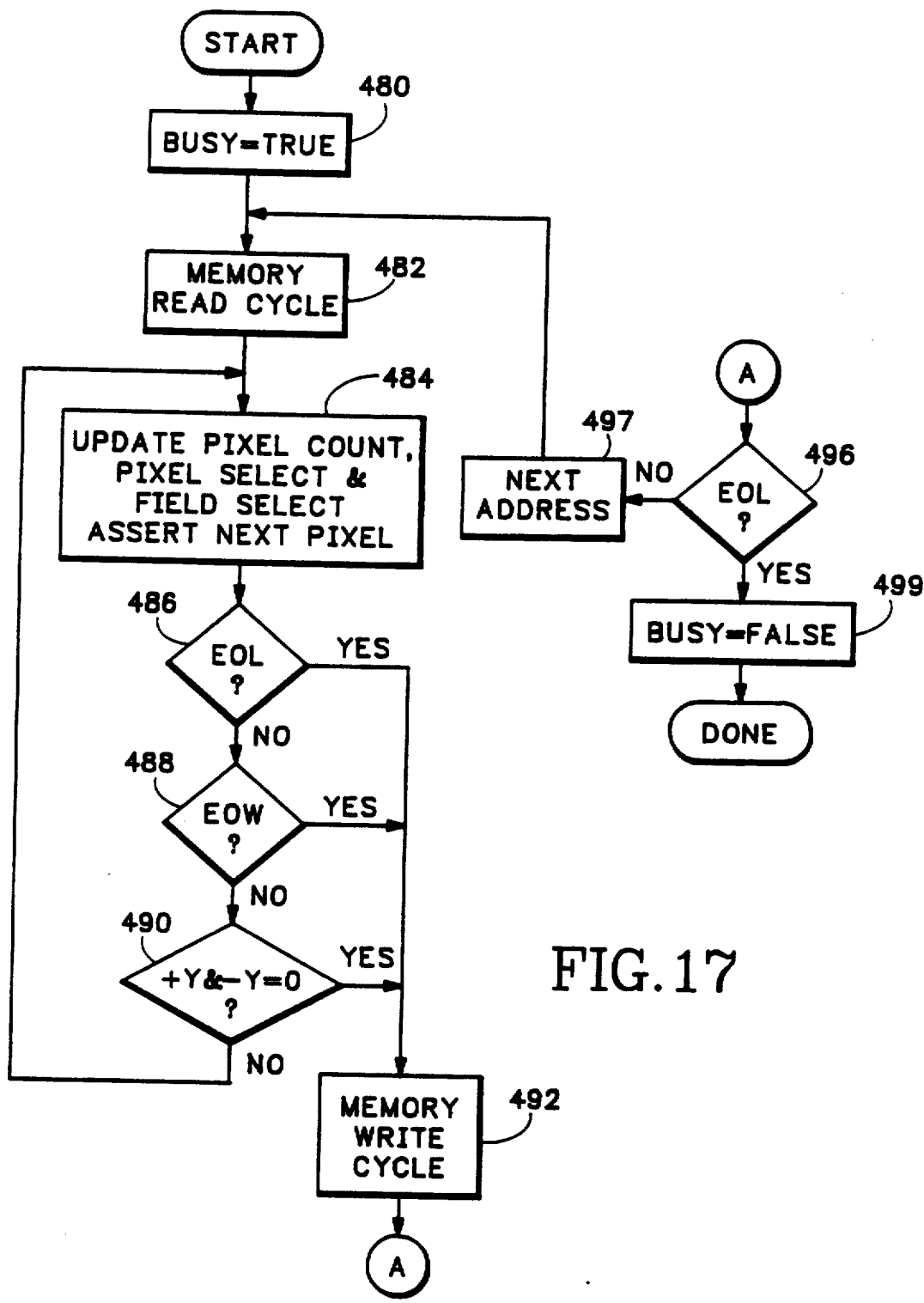
FIGS. 17-19 are flow charts depicting modes of operation of the mode control state machine of FIG. 16.

As previously mentioned, the mode control state machine 464 operates in any of three modes: draw, skip or run length. The PIXELATOR routine selects the current mode of operation by storing data in control registers 466. FIG. 17 illustrates the steps carried out by the mode control state machine when the pixel processor operates in the draw mode. Referring to FIGS. 16 and 17, on receipt of a GO signal, the state machine 464 sets its BUSY output bit true (step 480) and initiates a first bit map memory read cycle (step 482) by transmitting a READ request to DMA request state machine 468. Thereafter, pixel insert register 448 stores the pixel data word containing a bit or bits corresponding to the origin of the line. Next, mode control state machine 464 sets its FIELD SELECT signal to select the storage location within pixel insert register 448 of the bit corresponding to the original pixel indicated by the BIT SELECT input data from control registers 466 and generates a NEXT PIXEL pulse (step 484). (If the COLOR/MONO input signal to state machine 464 indicates one of the color modes, the state machine sets the FIELD SELECT signal to select storage locations of the thee or four color pixels at the line origin.)

In response to the NEXT PIXEL pulse, the pixel insert register 448 replaces the selected bit or bits with output from color map RAM 458 and the half tone blocks 460-62 determine whether the next pixels of the line should turn on or off. State machine 464 updates a count of pixels processed (step 484) and if the count reaches the length of the line indicated by the LENGTH data in control registers 466, the state machine knows the pixel processor has completed line processing. Also in step 484, the state machine updates (increments or decrements depending on whether the +X or -X direction bits are set) the PIXEL SEL bits in the control registers to represent a position of the next bit or bits in the pixel data word.

After generating the NEXT PIXEL pulse in step 484, the mode control state machine determines from the pixel count whether the pixel processor has processed the pixel or pixels at the end of the line (EOL) (step 486). If not, the state machine determines from the PIXEL SEL and DIR fields whether the pixel processor has processed the last bit of the pixel data word in the insert register (step 488). If not, the state machine checks the +Y and -Y direction (DIR) input bits to determine if the line has a vertical component. If not, the state machine knows that an additional bit the pixel data word must be processed. In such case, the state machine returns to step 484, adjusts the FIELD SELECT signal to select the next bit or bits of the pixel data word and generates another NEXT PIXEL signal pulse to set the states of the selected bits in the pixel insert register 448.

The state machine continues to loop through steps 484, 486, 488 and 490 until all bits of the pixel data word in the pixel insert register corresponding to pixels in the line path have been appropriately set. When the result of any of the tests of steps 486, 488 or 490 is YES, the state machine initiates a pixel data write cycle (step 492) where the pixel data word is written back into the bit map. If the pixel processor has not processed the pixels or pixels at the end of the line (step 496), the state machine asserts a NEXT ADDRESS signal pulse (step 497) causing the bit map address generator 452 to alter its output to address a next pixel data word. The state machine then reverts to step 482 to initiate a new memory read cycle and continues to loop through steps 482-497 until in step 496 the state machine determines the pixel processor has processed all pixels in the line. It then sets the BUSY bit false (step 499) and terminates.

Figure 18:
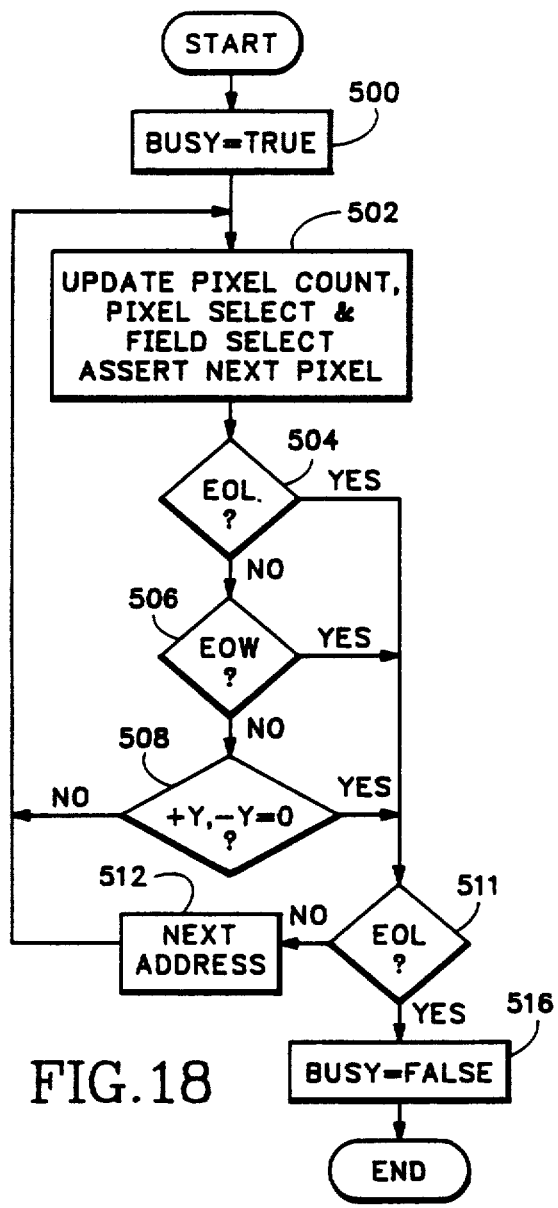

FIG. 18 is a flow chart illustrating the "skip" mode of pixel processor operation. In the skip mode of pixel processor operates as in the draw mode but does not read, modify or write any pixel data words to reflect a new line in the bit map. The skip mode of operation is a way to adjust the data stored in the pixel processor indicating the origin of a line. To set up the skip mode, the PIXELATOR routine sets the DRAW/SKIP/RL field to indicate skip mode operation, adjusts the LENGTH field to tell the pixel processor how many pixels are between the end of the last line drawn and the origin of the next line to be drawn, and adjusts the DIR field to represent the direction of the path between the endpoint of the last line and the origin of the next line. The PIXELATOR routine then initiates the GO signal input to the state machine.

Referring to FIG. 18, the mode control state machine sets the BUSY bit true (step 500) and asserts a NEXT PIXEL pulse (step 502) causing the half tone blocks to update pixel coordinates within the half tone cells. Also in step 502, the state machine updates the pixel count for the line and the PIXEL SEL field. The state machine then checks the pixel count for end of line (step 504), checks the PIXEL SEL field and DIR bits to determine if the pixel processor has finished processing a pixel data word (End Of Word, step 506) and checks the DIR bits to determine if the line has a vertical component (step 508). If the results of the tests of steps 504, 506 and 508 are all NO, the state machine reasserts the NEXT PIXEL pulse (step 502). The state machine continues to loop through steps 502-508 until the result of any of the tests of steps 504, 506 or 508 is yes. In such case the state machine determines whether the pixel processor has processed pixels at the end of the line (End Of Line, step 511) and if so, the state machine asserts a NEXT ADDRESS pulse (step 512) and continues to loop through steps 500-512 until the pixel processor has processed all pixels of the line as determined in step 511. At this point the state machine sets the BUSY bit false (step 516) and ends skip mode operation.

The run length mode permits the system to quickly process a dashed line wherein the length of each dash, and the spaces between the dashes, are of adjustable length. The PIXELATOR routine sets up the pixel processor for a run length mode operation by supplying the pixel processor with almost the same data needed to set up a draw mode operation. However, instead of providing the LENGTH data, the PIXELATOR routine provides a 32-bit data word including successive four bit fields representing lengths of successive dashes and spaces of the dashed line. The PIXELATOR routine also sets the DRAW/SKIP/RL field to indicate the run length mode of operation instead of the draw mode.

Figure 19:
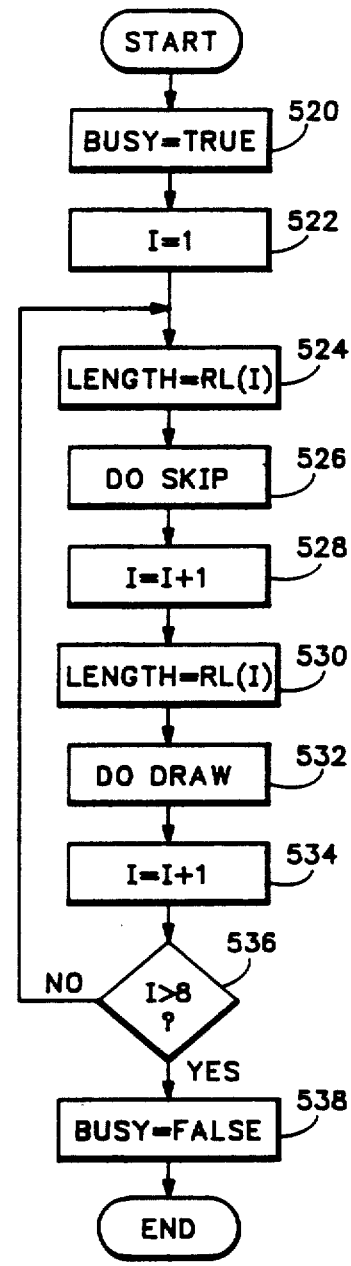

FIG. 19 is a flow chart illustrating operation of the mode control state machine for the run length mode. On receipt of a GO signal, the state machine sets the BUSY signal true (step 520) and sets a counter I equal to 1 (step 522). Thereafter, the state machine sets the LENGTH field equal to the value of the Ith 4-bit field RL(I) of the RUN LENGTH data (step 524). The first RUN LENGTH field RL(1) indicates the number of pixels (from 0 to 15) to skip. The state machine carries out a skip operation similar to that illustrated in FIG. 18 (step 526) to move the origin of a next line to be drawn of direction and distance represented by the DIR and LENGTH fields. The state machine increments I (step 528) and sets the LENGTH field equal to RL(I) (step 530). The second RUN LENGTH field RL(2) indicates a number of pixels (from 0 to 15) spanned by the first dash of the line. Then the state machine carries out a draw operation similar to that illustrated in FIG. 17 (step 532) to draw a line of length and direction represented by the DIR and LENGTH fields. The state machine again increments I (step 534), and if I is not greater than 8 (the number of 4-bit fields in the 32-bit RUN LENGTH data), the state machine reverts to step 524. The state machine loops through steps 524-536 until it determines in step 536 that I is greater than 8, indicating the dashed line has been fully processed. The state machine then sets BUSY false (step 538) and ends its operation.

Figure 20:
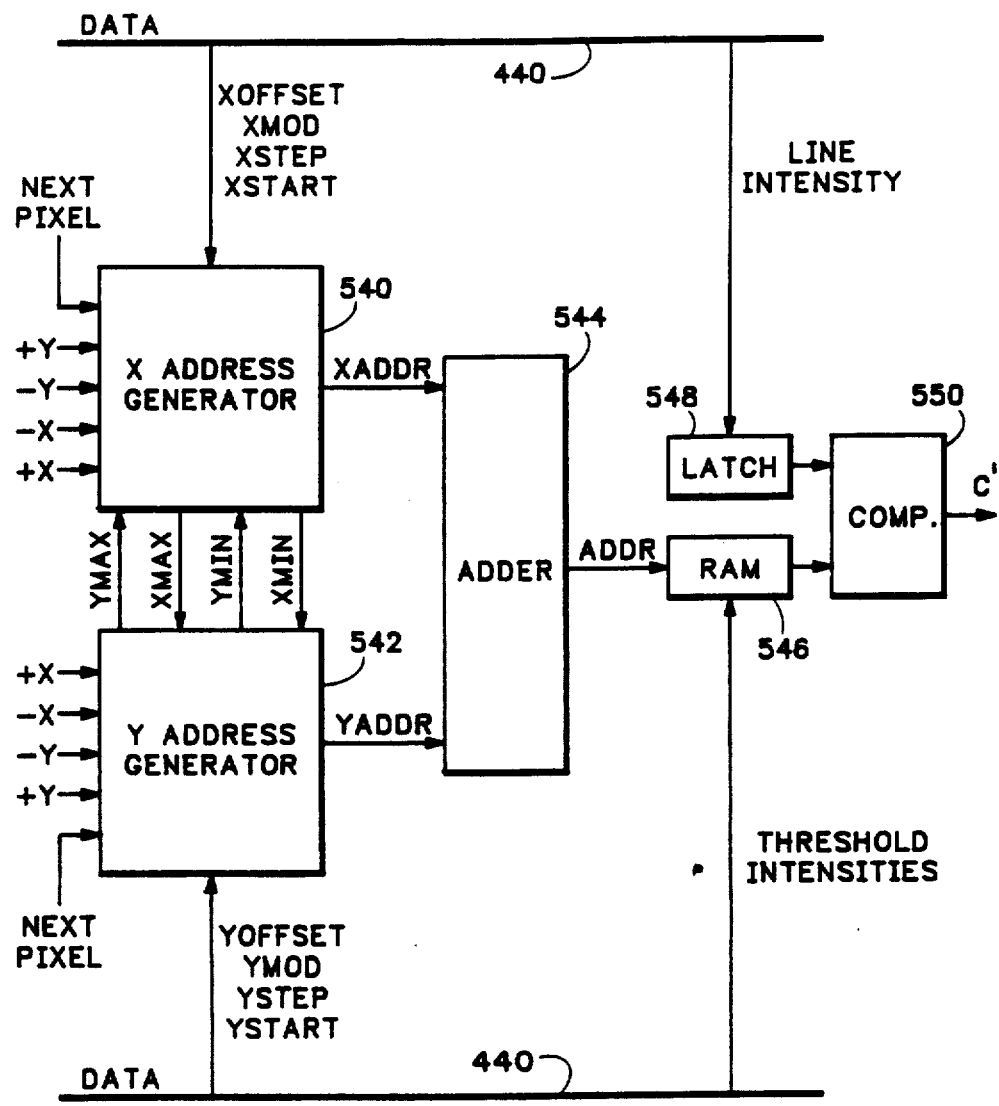
FIG. 20 illustrates a typical half toning circuit of FIG. 16 in more detailed block diagram form.

FIG. 20 illustrates cyan half tone block 460 of FIG. 16 in more detailed block diagram form. Magenta and yellow half tone blocks 461 and 462 are similar. The half tone block includes an X address generator 540, a Y address generator 542, an adder 544, a RAM 546, a latch 548, and a comparator 550. RAM 546 stores intensity threshold data for each pixel of a half tone cell at a separate address. The graphic design system supplies this intensity data via data bus 440 during system set up. In response to each NEXT PIXEL pulse, the X and Y address generators provide XADDR and YADDR coordinate data indicating an X, Y position of a pixel within the half tone cell. Adder 544 adds XADDR and YADDR to address RAM 546. The graphic design system arranges the intensity threshold data stored in RAM 546 such that it reads out the appropriate intensity threshold data for the pixel to an input of comparator 550. Latch 548 latches data from bus 440 indicating the desired intensity threshold of the line onto another input of comparator 550. Comparator 550 produces the C' output of the half tone block indicating when the line intensity data from latch 548 equals or exceeds the pixel intensity threshold data output of RAM 546.

The half tone cell is a variable number (XMOD) of pixels wide in the X direction and a variable number (YMOD) of pixels high in the Y direction. During system set up, the graphic design system stores in the X and Y address generators 540 and 542 the XMOD and YMOD data, as well as data (XOFFSET, YOFFSET) indicating the X and Y offset of the half tone cell array, and data (XSTEP and YSTEP) indicating how to increment or decrement XADDR and YADDR for a given cell size. The +X, −X, +Y, −Y direction (DIR) data stored in the control registers 566 of FIG. 16 are also input to X and Y address generators. These data inputs tell the X and Y address generators how to increment or decrement their output address values in response to each NEXT PIXEL pulse. The PIXELATOR routine may also load initial values XSTART, YSTART for XADDR and YADDR into the X and Y address generators via data bus 440.

Figure 21:
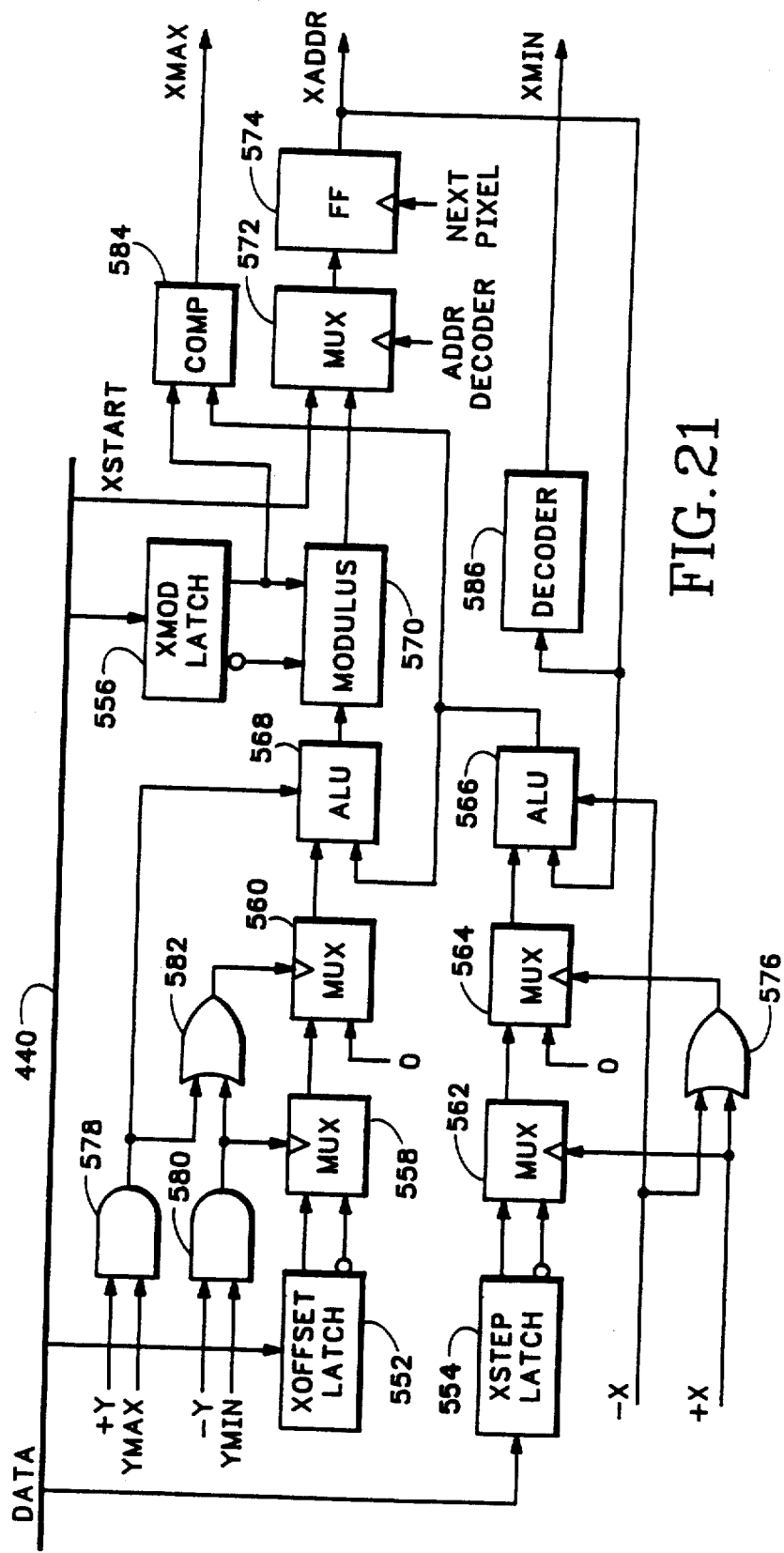
FIG. 21 illustrates the X address generator of FIG. 20 in more detailed block diagram form.

FIG. 21 illustrates the X address generator 540 of FIG. 20 in more detailed block diagram form. Referring to FIG. 21, the X address generator includes a set of latches 552, 554 and 556 for storing data indicating the X offset of the tone cell pattern (XOFFSET), a step amount for incrementing XADDR (XSTEP), and the width of the half tone cell in number of pixels (XMOD). (For normal operation XSTEP is set to one.) The XOFFSET latch 552 includes inverting and non-inverting outputs applied as alternative inputs to a multiplexer 558. The output of multiplexer 558, selectively either +XOFFSET or −XOFFSET, drives one input of a multiplexer 560 and a zero data value drives a second input of multiplexer 560. The XSTEP latch also includes inverting and non-inverting outputs connected to inputs of a multiplexer 562. The output of multiplexer 562, selectively either +XSTEP or −XSTEP, drives an input of a multiplexer 564. A second input of multiplexer 564 is set to zero. An arithmetic logic unit (ALU) 566 selectively adds or subtracts the output of multiplexer 564 to or from the last XADDR value produced by the XADDR generator. A second ALU 568 selectively adds or subtracts the output of multiplexer 560 to or from the output of ALU 566. A modulus block 570 passes the output of ALU 568 to another multiplexer 572 if the output of ALU is not greater than the value of XMOD stored in latch 556. Otherwise, modulus block 570 passes the difference between the output of ALU 568 and XMOD to multiplexer 572. During normal operation, multiplexer 572 forwards the output of modulus block 570 to a flip-flop 574 clocked by the NEXT PIXEL signal. The output of flip-flop 574 is the current XADDR output of the X address generator. When the mode control state machine generates a NEXT PIXEL pulse, flip-flop 574 clocks its input onto its output, thereby updating XADDR. Data bus 440 supplies the XSTART data to another input of multiplexer 572. The PIXELATOR routine may set XADDR to XSTART to select a new line origin along the X axis of the half tone cell by placing the XSTART value on bus 440 and switching multiplexer 572 to pass that value to flip-flop 574.

The $-X$ direction bit controls multiplexer 562. If $-X$ is set, multiplexer 562 selects $-XSTEP$ (i.e., $-1$) as its output and otherwise selects $+XSTEP$ (i.e., $+1$). An OR gate 576 ORs the $+X$ and $-X$ bits to produce an output controlling multiplexer 564. The $-X$ bit also controls whether ALU 566 adds or subtracts. Thus, when either $-X$ or $+X$ is set, the line has a horizontal component and ALU 566 increments or decrements XADDR depending on whether the next processed pixel is to the right or left of the last pixel processed within the half tone cell.

An AND gate 578 ANDs $+Y$ and a YMAX bit produced by the Y address generator, while an AND gate 580 ANDs $-Y$ and a YMIN bit also produced by the Y address generator. AN OR gate 582 ORs the outputs of AND gates 578 and 580. The output of AND gate 580 controls switching of multiplexer 558, the output of OR gate 582 controls switching of multiplexer 560, and the output of OR gate 578 controls whether ALU 568 adds or subtracts. The YMAX and YMIN bits indicate when the next pixel to be processed is within a half tone cell above or below the half tone cell containing the last pixel processed. If the line has a vertical component, multiplexer 560 passes $+XOFFSET$ or $-XOFFSET$ to ALU 568 and ALU 568 adds or subtracts this offset value to or from the output of ALU 568 depending on the direction of the line. If there is no offset, the value of XOFFSET is set to zero. However, if the half tone cells are offset in the X direction by one or more pixels to the left or right, the XOFFSET is a positive or negative value reflecting the amount of offset. Thus, ALU 568 further increments or decrements XADDR by XOFFSET to account for the X offset at cell boundaries.

A comparator 584 compares the output of ALU 566 to a non-inverting output of latch 556, the comparator asserting an XMAX signal when its inputs are equal indicating that the current pixel is at the rightmost boundary of the half tone cell. The XADDR output of flip-flop 574 drives a decoder 586 asserting an XMIN output when XADDR is zero. The XMIN signal indicates when the current pixel is at the left most boundary of the half tone cell. The XMAX and XMIN signals provide input to the Y address generator for use when half tone cells are vertically offset.

The Y address generator is topologically identical to the X address generator but has different inputs and outputs. In the Y address generator, latches 552, 554 and 556 store data indicating an amount of half tone cell pattern Y direction offset (YOFFSET), a step amount for incrementing YADDR (YSTEP), and the height of the half tone cell (YMOD). Multiplexer 572 selectively passes a starting YADDR value (YSTART) from data bus 440 to flip-flop 574. While under normal operation XSTEP is always set to one in the X address generator, YSTEP is set equal to the width of the half tone cell. The Y address generator must increment or decrement YADDR by the width of the half tone cell in order to address intensity threshold data corresponding to a pixel of the half tone cell immediately above or below the pixel of the half tone cell corresponding to the last addressed intensity threshold data. In the Y address generator comparator 584, decoder 586, and flip-flop 574 produce YMAX, YMIN, and YADDR. The $+X$ and XMAX signals provide inputs to AND gate 578 and the $-X$ and XMIN signal drive AND gate 580. The $-Y$ and $+Y$ signals drive OR gate 576.

Thus, in accordance with the present invention, stages of a graphics data processing pipeline are interconnected by a common bus for conveying data and arbitration signals to and from each stage. Each data transmitting stage arbitrates for and acquires control of the bus when it has output data to transmit to an addressable storage location within a next stage. Each stage that receives data from another stage generates a BUSY bit indicating whether it is processing data or awaiting new input data from its preceding stage. When one pipeline stage has output data to transmit to a next pipeline stage, the transmitting stage periodically polls the receiving stage by acquiring control of the bus and placing on the bus a particular address associated with the next stage. Whenever the next stage detects the presence of the particular address on the bus, it places its BUSY bit on the data lines of the bus. When the sending stage determines from the state of the BUSY bit that the next stage is ready to receive input data, the sending stage acquires control of the bus and sends the input data thereon to the next stage.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A data processing system implementing a sequence of data processing operations, comprising:
   a bus for conveying data, an address and a bus arbitration signal;
   a plurality of data processing stages connected to said bus for receiving the data, address and arbitration signal conveyed by the bus,
   each stage comprising processing means for performing a separate data processing operation of said sequence by producing output data and addresses in response to input data received on said bus, output data produced by each of said stages other than a stage performing a last operation of said sequence being provided as input data to another of said stages via said bus, and,
   each stage further comprising bus master means responsive to requests from said processing means of the same said stage for monitoring said bus arbitration signal to determine when said bus is not in use by another stage, and for setting said bus arbitration signal to indicate said bus is in use wherein said bus arbitration signal is transmitted on said bus for reception by another of said data processing stages via said bus, transmitting output data and addresses on said bus, and thereafter setting said bus arbitration signal to indicate said bus is not in use, such that said bus master means in said plurality of data processing stages provides decentralized bus arbitration for use of said bus.

2. The data processing system in accordance with claim 1 further comprising an addressable memory connected to said bus for reading out data onto said bus when read accessed, wherein the bus master means of at least one of said stages read accesses said addressable memory via said bus to obtain input data for said processing means.

3. The data processing system in accordance with claim 1 further comprising an addressable memory connected to said bus for storing data conveyed on said bus when write accessed and reading out data onto said bus when read accessed, wherein said bus master means of at least one of said stages read and write accesses said addressable memory via said bus to obtain input data for said processing means and to store in said memory output data produced by said processing means.

4. The data processing system in accordance with claim 1 further comprising an addressable memory connected to said bus for storing data conveyed on said bus when write accessed and for reading out data onto said bus when read accessed, wherein said bus master means of at least two of said stages read and write access said addressable memory via said bus to obtain input data for said processing means and to store in said memory output data produced by said processing means.

5. The data processing system in accordance with claim 1 wherein at least one of said stages includes means responsive to a particular address on said bus for placing on said bus data indicating whether said at least one stage is ready to receive input data.

6. The data processing system in accordance with claim 1 wherein at least one of said stages comprises means for placing a particular address on said bus and wherein said another of said stages includes means responsive to said particular address on said bus for placing on said bus data indicating whether said another of said stages is ready to receive as input data output data produced by said at least one stage.

7. The data processing system in accordance with claim 1 wherein at least one of said stages further comprises:
   means for storing input data transmitted on said bus when said input data is accompanied on said bus by a first particular address; and
   means responsive to a second particular address transmitted on said bus, for placing on said bus data indicating whether said processing means has completed performing a computation.

8. A data processing system implementing a sequence of data processing operations, comprising:

a bus for concurrently conveying data, an address, and a bus arbitration signal;
an addressable memory connected to said bus for storing data conveyed on said bus and reading out data onto said bus;
a plurality of data processing stages connected in parallel to said bus and concurrently receiving the data, address and arbitration signal conveyed by the bus,
each stage comprising processing means for performing a separate data processing operation of said sequence by producing output data and addresses in response to input data received on said bus, output data produced by each of said stages other than a stage performing a last operation of said sequence of operations being provided as input data to another of said stages via said bus, and
each stage further comprising bus master means responsive to requests from said processing means for monitoring said bus arbitration signal to determine when said bus is not in use by another stage, for setting said bus arbitration signal to indicate said bus is in use wherein said bus arbitration signal is transmitted on said bus for reception by another of said data processing stages via said bus, and for transmitting output data and addresses on said bus while controlling said bus and thereafter setting said bus arbitration signal to relinquish control of the bus, such that said monitoring and setting of said bus arbitration signal provides decentralized bus arbitration, and wherein the bus master means of at least one of said stages read and write accesses said addressable memory via said bus to obtain input data for said processing means and to store output data produced by said processing means,
at least one of said stages further comprising means for placing a particular address on said bus, and
at least one other of said stages further comprising means responding to said particular address placed on said bus by placing data on said bus indicating whether said one other of said stages is ready to receive as input data output data produced by said at least one stage.

* * * * *